(12) United States Patent
Minezaki

(10) Patent No.: US 9,792,142 B2
(45) Date of Patent: Oct. 17, 2017

(54) INFORMATION PROCESSING DEVICE AND RESOURCE ALLOCATION METHOD

(71) Applicant: FUJITSU LIMITED, Kawasaki-shi, Kanagawa (JP)

(72) Inventor: Juntaro Minezaki, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 14/851,016

(22) Filed: Sep. 11, 2015

(65) Prior Publication Data

US 2016/0004554 A1    Jan. 7, 2016

Related U.S. Application Data

(63) Continuation of application No. PCT/JP2013/058159, filed on Mar. 21, 2013.

(51) Int. Cl.
*G06F 9/46* (2006.01)
*G06F 9/455* (2006.01)
(Continued)

(52) U.S. Cl.
CPC ........ *G06F 9/45558* (2013.01); *G06F 9/5077* (2013.01); *G06F 11/20* (2013.01); *G06F 2009/4557* (2013.01)

(58) Field of Classification Search
None
See application file for complete search history.

(56) References Cited

U.S. PATENT DOCUMENTS

2003/0217088 A1\* 11/2003 Takamoto ........... G06F 11/2035
718/1

2007/0180314 A1    8/2007 Kawashima et al.
(Continued)

FOREIGN PATENT DOCUMENTS

JP    2003-330740    11/2003
JP    2007-207219    8/2007
(Continued)

OTHER PUBLICATIONS

International Search Report and Written Opinion of the International Searching Authority (Form PCT/ISA/210, Form PCT/ISA/237), mailed in connection with PCT/JP2013/058159 and mailed Jun. 4, 2013 (8 pages).

(Continued)

*Primary Examiner* — Francisco Aponte
*Assistant Examiner* — Melissa Alfred
(74) *Attorney, Agent, or Firm* — Fujitsu Patent Center

(57) ABSTRACT

A device includes a storage which has stored therein setting information that specifies, for each virtual machine to be created, the number of arithmetic processing unit cores that have to be allocated to a virtual machine, and group information that represents a plurality of virtual machines operating in cooperation as a group, from among the virtual machines represented by the setting information, and a virtual machine monitor, when a first virtual machine has been created, from among the virtual machines represented by the setting information, which refers to the setting information and the group information so as to allocate as many arithmetic processing unit cores as the setting information specifies to the first virtual machine, according to a rule that takes account of a decrease in operation performance of all the operable virtual machines that is associated with a failure occurring in any of the arithmetic processing units.

7 Claims, 25 Drawing Sheets

(51) Int. Cl.
    *G06F 11/20*     (2006.01)
    *G06F 9/50*     (2006.01)

(56) References Cited

U.S. PATENT DOCUMENTS

2008/0148015 A1*   6/2008   Takamoto ........... G06F 11/2043
                                                                    712/203
2010/0229171 A1    9/2010   Yoshimura et al.

FOREIGN PATENT DOCUMENTS

| | | |
|---|---|---|
| JP | 2008-152594 | 7/2008 |
| JP | 2008-269440 A | 11/2008 |
| JP | 2010-205209 | 9/2010 |
| JP | 2010-211819 | 9/2010 |

OTHER PUBLICATIONS

Japanese Office Action mailed on Dec. 6, 2016 for corresponding Japanese Patent Application No. 2015-506495, with Partial English Translation, 6 pages.

* cited by examiner

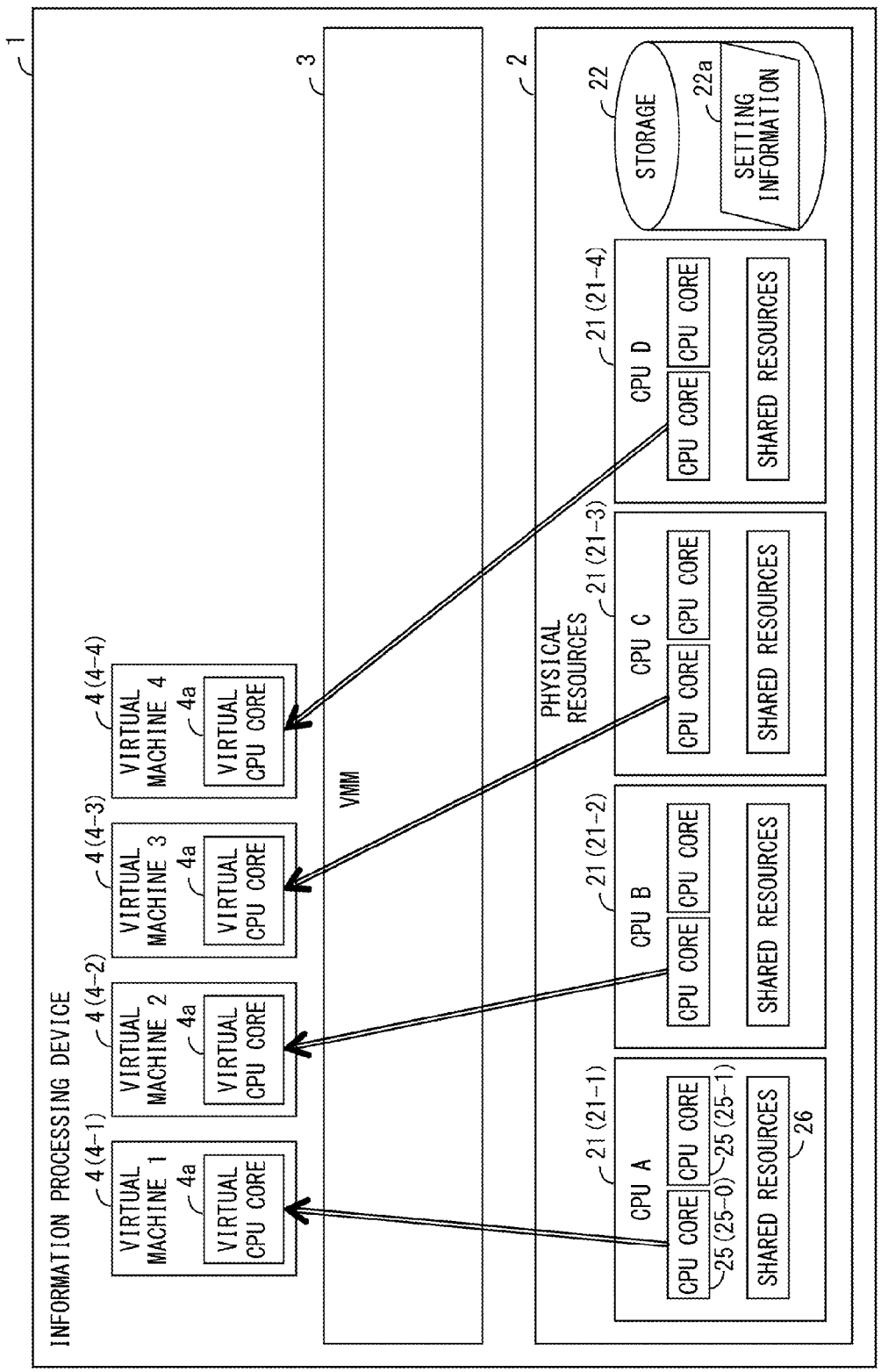
F I G. 1

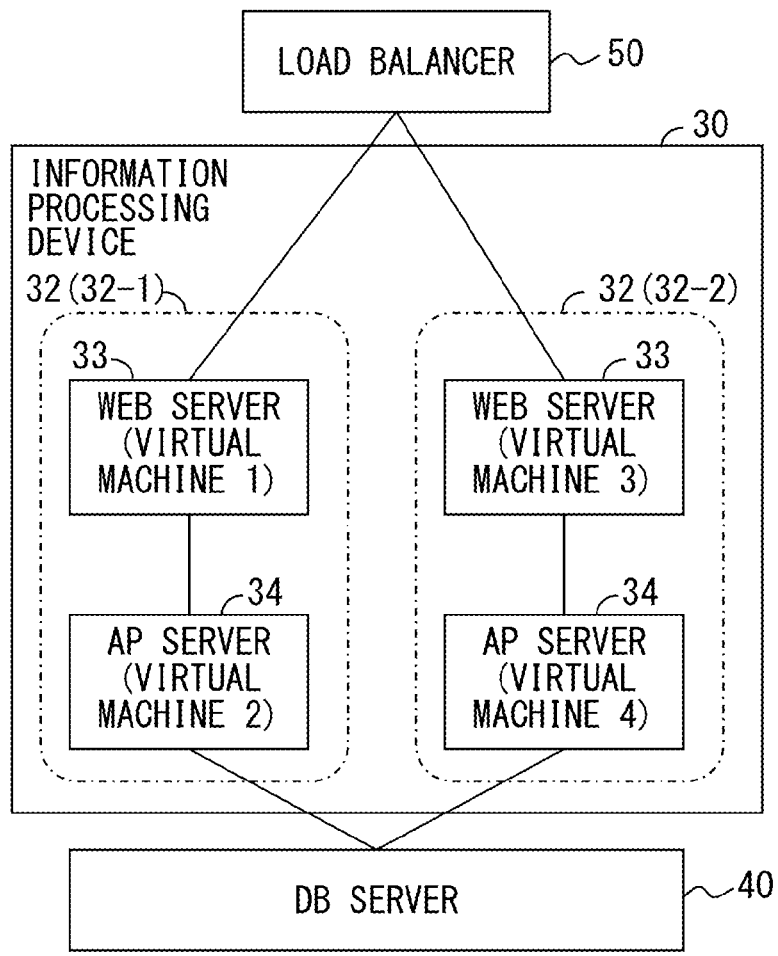
F I G. 3

| VIRTUAL MACHINE NUMBER | NUMBER OF CPU CORES TO BE ALLOCATED | GROUP NUMBER |
|---|---|---|
| 1 | 1 | 1 |
| 2 | 1 | 1 |
| 3 | 1 | 2 |
| 4 | 1 | 2 |

| PATTERN | PRIORITY TO BE SET |
|---|---|
| A VIRTUAL MACHINE IS NOT ALLOCATED WITHIN A CPU PACKAGE | HIGH |
| THE GROUP NUMBERS OF ALL THE VIRTUAL MACHINES THAT USE CPU CORES WITHIN A CPU PACKAGE ARE IDENTICAL TO THE GROUP NUMBER OF THE VIRTUAL MACHINE WHOSE CPU CORE IS TO BE SWITCHED | MEDIUM |
| THE GROUP NUMBER OF ANY OF THE VIRTUAL MACHINES THAT USE CPU CORES WITHIN A CPU PACKAGE IS DIFFERENT FROM THE GROUP NUMBER OF THE VIRTUAL MACHINE WHOSE CPU CORE IS TO BE SWITCHED | LOW |

F I G. 5

| CORE MANAGING NUMBER | POSITION INFORMATION | | VIRTUAL MACHINE TO BE ALLOCATED TO | NON-ALLOCATION |
|---|---|---|---|---|
| | CPU PACKAGE NUMBER | CPU CORE NUMBER | | |
| 1 | A | 0 | VIRTUAL MACHINE 1 | No |
| 2 | A | 1 | AVAILABLE | No |
| 3 | B | 0 | VIRTUAL MACHINE 2 | No |
| 4 | B | 1 | AVAILABLE | No |
| 5 | C | 0 | VIRTUAL MACHINE 3 | No |
| 6 | C | 1 | AVAILABLE | No |
| 7 | D | 0 | VIRTUAL MACHINE 4 | No |
| 8 | D | 1 | AVAILABLE | No |

FIG. 6

| CPU PACKAGE NUMBER | ALLOCATION PRIORITY |
|---|---|
| A | MEDIUM |
| B | MEDIUM |
| C | LOW |
| D | LOW |

226

F I G. 7

| CORE MANAGING NUMBER | POSITION INFORMATION | | VIRTUAL MACHINE TO BE ALLOCATED TO | NON-ALLOCATION |
|---|---|---|---|---|
| | CPU PACKAGE NUMBER | CPU CORE NUMBER | | |
| 1 | A | 0 | AVAILABLE | Yes |
| 2 | A | 1 | AVAILABLE | Yes |
| 3 | B | 0 | VIRTUAL MACHINE 2 | No |
| 4 | B | 1 | VIRTUAL MACHINE 1 | No |
| 5 | C | 0 | VIRTUAL MACHINE 3 | No |
| 6 | C | 1 | AVAILABLE | No |
| 7 | D | 0 | VIRTUAL MACHINE 4 | No |
| 8 | D | 1 | AVAILABLE | No |

F I G. 8

| CORE MANAGING NUMBER | POSITION INFORMATION | | VIRTUAL MACHINE TO BE ALLOCATED TO | NON-ALLOCATION |
|---|---|---|---|---|
| | CPU PACKAGE NUMBER | CPU CORE NUMBER | | |
| 1 | A | 0 | VIRTUAL MACHINE 1 | No |
| 2 | A | 1 | AVAILABLE | No |
| 3 | B | 0 | VIRTUAL MACHINE 2 | No |
| 4 | B | 1 | AVAILABLE | No |
| 5 | C | 0 | VIRTUAL MACHINE 3 | No |
| 6 | C | 1 | VIRTUAL MACHINE 4 | No |

F I G. 9

| CORE MANAGING NUMBER | POSITION INFORMATION | | VIRTUAL MACHINE TO BE ALLOCATED TO | NON-ALLOCATION |
|---|---|---|---|---|
| | CPU PACKAGE NUMBER | CPU CORE NUMBER | | |
| 1 | A | 0 | AVAILABLE | Yes |
| 2 | A | 1 | AVAILABLE | Yes |
| 3 | B | 0 | VIRTUAL MACHINE 2 | No |
| 4 | B | 1 | VIRTUAL MACHINE 1 | No |
| 5 | C | 0 | VIRTUAL MACHINE 3 | No |
| 6 | C | 1 | VIRTUAL MACHINE 4 | No |

| CORE MANAGING NUMBER | POSITION INFORMATION | | VIRTUAL MACHINE TO BE ALLOCATED TO | NON-ALLOCATION |
|---|---|---|---|---|
| | CPU PACKAGE NUMBER | CPU CORE NUMBER | | |
| 1 | A | 0 | VIRTUAL MACHINE 1 | No |
| 2 | A | 1 | VIRTUAL MACHINE 3 | No |
| 3 | B | 0 | VIRTUAL MACHINE 2 | No |
| 4 | B | 1 | VIRTUAL MACHINE 4 | No |
| 5 | C | 0 | AVAILABLE | Yes |
| 6 | C | 1 | AVAILABLE | Yes |

FIG. 11

| CPU MANAGING NUMBER | POSITION INFORMATION | | VIRTUAL MACHINE TO BE ALLOCATED TO | NON-ALLOCATION |
|---|---|---|---|---|
| | CPU PACKAGE NUMBER | CPU CORE NUMBER | | |
| 1 | A | 0 | VIRTUAL MACHINE 1 | No |
| 2 | A | 1 | AVAILABLE | No |
| 3 | B | 0 | VIRTUAL MACHINE 2 | No |
| 4 | B | 1 | AVAILABLE | No |
| 5 | C | 0 | VIRTUAL MACHINE 3 | No |
| 6 | C | 1 | AVAILABLE | No |
| 7 | D | 0 | VIRTUAL MACHINE 4 | No |
| 8 | D | 1 | AVAILABLE | No |
| 9 | E | 0 | VIRTUAL MACHINE 5 | No |
| 10 | E | 1 | AVAILABLE | No |
| 11 | F | 0 | VIRTUAL MACHINE 6 | No |
| 12 | F | 1 | AVAILABLE | No |

FIG. 19

| CPU SERIAL NUMBER | CORRECTABLE-ERROR-ACCUMULATED VALUE |
| --- | --- |
| 12345678 (CPU A) | 103567 |
| 90123456 (CPU B) | 1674 |
| 65748392 (CPU C) | 976 |
| 10928374 (CPU D) | 2053 |
| 55667788 (CPU E) | 27 |
| 91827364 (CPU F) | 1024 |

| CPU PACKAGE NUMBER | ALLOCATION PRIORITY | ERROR-ACCUMULATED VALUE |
|---|---|---|
| A | MEDIUM | 103567 |
| B | MEDIUM | 1674 |
| C | MEDIUM | 976 |
| D | LOW | 2053 |
| E | LOW | 27 |
| F | LOW | 1024 |

F I G. 2 1

| CPU MANAGING NUMBER | POSITION INFORMATION | | VIRTUAL MACHINE TO BE ALLOCATED TO | NON-ALLOCATION |
|---|---|---|---|---|
| | CPU PACKAGE NUMBER | CPU CORE NUMBER | | |
| 1 | A | 0 | AVAILABLE | Yes |
| 2 | A | 1 | AVAILABLE | Yes |
| 3 | B | 0 | VIRTUAL MACHINE 2 | No |
| 4 | B | 1 | AVAILABLE | No |
| 5 | C | 0 | VIRTUAL MACHINE 3 | No |
| 6 | C | 1 | VIRTUAL MACHINE 1 | No |
| 7 | D | 0 | VIRTUAL MACHINE 4 | No |
| 8 | D | 1 | AVAILABLE | No |
| 9 | E | 0 | VIRTUAL MACHINE 5 | No |
| 10 | E | 1 | AVAILABLE | No |
| 11 | F | 0 | VIRTUAL MACHINE 6 | No |
| 12 | F | 1 | AVAILABLE | No |

FIG. 22

INFORMATION PROCESSING DEVICE AND RESOURCE ALLOCATION METHOD

CROSS-REFERENCE TO RELATED APPLICATION

This application is a continuation application of International Application PCT/JP2013/058159 filed on Mar. 21, 2013 and designated the U.S., the entire contents of which are incorporated herein by reference.

FIELD

The embodiments discussed herein are related to a technique for controlling an information processing device in which a plurality of virtual machines are created.

BACKGROUND

In recent years, a virtual machine (VM) that is one of the virtual techniques for an information processing device (computer) has broadly been applied to information processing devices. In the execution environment of such a virtual machine, hardware (a resource) of an information processing device is virtualized, and each virtual machine operates on the virtualized hardware. Thus, each virtual machine individually operates in an entirely independent manner. As a result, using a virtual machine technique permits operating of one information processing device as a plurality of servers.

The information processing device is provided with one or more arithmetic processing units. In general, the arithmetic processing unit is a device called a CPU (central processing unit) or an MPU (micro-processing unit) that executes a program. The arithmetic processing unit may be, for example, a processor. The arithmetic processing unit will hereinafter be referred to as "CPU" for convenience.

Each of the virtual machines created on the information processing device is allocated one CPU as a part of resources. In general, the CPU provided in the information processing device includes a plurality of CPU cores that form its core. Thus, in general, allocation of a CPU to a virtual machine is performed on a CPU-core basis.

FIG. 1 is a block diagram of an example of allocation of a CPU core to a virtual machine. The example in FIG. 1 is a case in which four virtual machines 4 (4-1 to 4-4) are operated on a VMM (virtual machine monitor) 3. An information processing device 1 includes four CPUs 21 (21-1 to 21-4) and a storage 22 as resources 2. The VMM 3 is also called a hypervisor.

The storage 22 is, for example, an ensemble of a secondary storage and a memory module. A resource that has to be allocated to a virtual machine 4 to be created is designated by setting information 22a stored in the storage 22. The VMM 3 refers to the setting information 22a and allocates the resources to the respective virtual machines 4.

Each of the CPUs 21 includes two CPU cores 25 (25-0 and 25-1) and shared resources 26. For example, the shared resources 26 include an LLC (last level cache), an interface with the storage 22, and an interface that permits communication with the other CPUs 21. The CPU will hereinafter be referred to as "CPU package".

In FIG. 1, allocation of a CPU core 25 to each virtual machine 4 is represented by an arrow. In the example of FIG. 1, one of the CPU cores 25-0 in each of the CPU packages 21-1 to 21-4 is allocated to each of the virtual machines 4-1 to 4-4. One CPU core 25 in each of the CPU packages 21 is allocated to each of the virtual machines 4 because processing performance per CPU core 25 provided in a CPU package 21 becomes higher with an increase in the number of CPU cores 25 that are not in use.

As described above, the resources 2 are virtualized. Accordingly, each of the CPU cores 25 in each of the CPU packages 21 is also virtualized. Allocation of a CPU core 25 to each virtual machine 4 is performed by allocating a virtual CPU core 4a that is a virtualized CPU core 25.

The VMM 3 also has a plurality of functions to increase the availability of a virtual machine 4. A failure localization function and a resource reallocation function are typical examples of the functions.

The failure localization function is a function for localizing a range influenced by a failure when the failure occurs in any hardware that constitutes the resources 2. For example, when a failure has occurred in the CPU package 21-1, the virtual machines 4-2 to 4-4 other than the virtual machine 4-1 that uses the CPU core 25-0 in the CPU package 21-1 can continue to operate normally because of the failure localization function.

The resource reallocation function is a function for reallocating other hardware to a virtual machine 4 that uses hardware in which a sign of failure has appeared when the sign of failure has appeared in any hardware that constitutes the resources 2. For example, when a failure sign has appeared in the CPU package 21-1, the resource reallocation function allocates a CPU core 25 in another CPU package 21 to the virtual machine 4-1 that uses the CPU core 25-0 in the CPU package 21-1. Such a reallocation (change in allocation) of a CPU core 25 permits the virtual machine 4-1 to continue to operate.

As described above, each virtual machine 4 created on the information processing device 1 individually operates in an entirely independent manner. However, a plurality of virtual machines 4 may cooperate with one another. A case in which the information processing device 1 is used as an information processing device 30 in FIG. 3 is an example of this.

FIG. 3 is a block diagram which illustrates an example of a web system. The web system provides data (content) managed by a database (DB) server 40 or data generated from the data managed by the database server 40 by use of a load balancer 50 and an information processing device 30. On the information processing device 30, two processing systems 32 (32-1 and 32-2) that have a virtual machine 33 operating as one web server and a virtual machine 34 operating as one application (AP) server are constructed. The load balancer 50 sorts requests issued by a terminal that is connected via a network to one of the two processing systems 32. In each of the two processing systems 32, the two virtual machines 33 and 34 cooperate with each other to offer a service such as providing the data managed by the DB server 40 to the terminal that has transmitted the requests.

It is assumed that the information processing device 1 is used as the information processing device 30 of FIG. 3. It is further assumed that the virtual machines 4-1 and 4-2 operate as the virtual machines 33 and 34 in the processing system 32-1, and the virtual machines 4-3 and 4-4 operate as the virtual machines 33 and 34 in the processing system 32-2.

When a failure has occurred in the CPU package 21-1 or a failure sign has been detected, a CPU core 25 that is newly allocated to the virtual machine 4-1 is selected from the CPU packages 21-2 to 21-4. In this case, to avoid any confusion, a failure occurrence will herein be used in a sense including failure sign detection unless otherwise specified.

As assumed above, operation performance of the information processing device 1 (web system) when a failure has occurred in any of the CPU packages 21 varies according to a CPU package 21 including a CPU core 25 to be newly allocated to the virtual machine 4-1.

When a CPU core 25 in the CPU package 21-2 is newly allocated to the virtual machine 4-1, one of the processing systems 32 can continue to operate even if a failure has occurred in any one of the CPU packages 21-2 to 21-4. When a failure has occurred in the CPU package 21-2, the processing system 32-2 can continue to operate, and when a failure has occurred in the CPU package 21-3 or 21-4, the processing system 32-1 can continue to operate.

When a CPU core 25 in the CPU package 21-3 is newly allocated to the virtual machine 4-1, both of the processing systems 32 are not allowed to continue to operate when a failure has occurred in the CPU package 21-3. However, the processing system 32-2 can continue to operate when a failure has occurred in the CPU package 21-2, and the processing system 32-1 can continue to operate when a failure has occurred in the CPU package 21-4.

When a CPU core 25 in the CPU package 21-4 is newly allocated to the virtual machine 4-1, both of the processing systems 32 are not allowed to continue to operate when a failure has occurred in the CPU package 21-4. However, the processing system 32-2 can continue to operate when a failure has occurred in the CPU package 21-2, and the processing system 32-1 can continue to operate when a failure has occurred in the CPU package 21-3.

As described above, when a plurality of virtual machines 4 cooperate with one another, operation performance of the information processing device 1, that is, operation performance of all the virtual machines 4 varies according to a CPU package 21 including a CPU core 25 to be newly allocated to a virtual machine 4. Depending on a CPU package 21 including a CPU core 25 to be newly allocated, a failure that occurs in one CPU package 21 does not allow the information processing device 1 to continue to operate. Accordingly, when a CPU core 25 is newly allocated to a virtual machine 4, it is important to prevent a decrease in operation performance of all the virtual machines 4 due to a failure in a CPU package 21 that occurs after the allocation; in other words, it is important to have fewer virtual machines 4 that are not allowed to actually operate.

There is a conventional information processing device that automatically sets, for each virtual machine, requirements which a CPU package including a CPU core to be allocated to a virtual machine has to meet when a failure occurs in the CPU package including the CPU core used by the virtual machine. A plurality of requirements including an order of priority can be set. Accordingly, in the information processing device that automatically sets requirements, a CPU core in the CPU package that meets the set requirements can be allocated to a virtual machine.

An occupancy allocation requirement and an occupancy allocation requirement including exclusive cooperation are examples of the requirements that can be set by the conventional information processing device. The occupancy allocation requirement allocates only one virtual machine to one CPU package. The occupancy allocation requirement including exclusive cooperation does not allocate CPU cores in the same CPU package to a designated virtual machine.

In the conventional information processing device, for example, when the occupancy allocation requirement and the occupancy allocation requirement including exclusive cooperation are set together, one of them is set as an alternative requirement. Accordingly, when there is not any CPU package that meets the non-alternative requirement, the conventional information processing device performs allocation according to the order of priority between the requirements by allocating a CPU core in the CPU package that meets the alternative requirement.

According to the conventional information processing device, the occupancy allocation requirement including exclusive cooperation is set in order to prevent a double failure through sharing the same CPU package. Accordingly, a target virtual machine for which the occupancy allocation requirement including exclusive cooperation is set is a virtual machine that cooperates with other virtual machines. Taking the information processing device 30 in FIG. 3 as an example, this means that, as far as possible, the CPU cores in the same CPU package are not allocated to the two virtual machines 33 and 34 included in the same processing system 32. Thus, in the conventional information processing device, it is very difficult to reduce the number of processing systems that are not allowed to continue to operate due to a failure that occurs in the CPU package after its CPU core is newly allocated. Thus, in the conventional information processing device, the influence of a failure that occurs in a CPU package is likely to be greater when a plurality of virtual machines cooperate with one another.

Patent Document 1: Japanese Laid-open Patent Publication No. 2010-205209

Patent Document 2: Japanese Laid-open Patent Publication No. 2007-207219

SUMMARY

According to an aspect of the embodiments, an information processing device includes a storage which has stored therein setting information that specifies, for each virtual machine to be created, the number of arithmetic processing unit cores that have to be allocated to a virtual machine, and group information that represents a plurality of virtual machines operating in cooperation as a group, from among the virtual machines represented by the setting information, and a virtual machine monitor, when a first virtual machine to which the arithmetic processing unit cores are to be allocated has been created, from among the virtual machines represented by the setting information, which refers to the setting information and the group information so as to allocate as many arithmetic processing unit cores as the setting information specifies to the first virtual machine, according to a rule that takes account of a decrease in operation performance of all the operable virtual machines that is associated with a failure occurring in any of the arithmetic processing units provided with the arithmetic processing unit cores.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram of an example of allocation of a CPU core to a virtual machine;

FIG. 3 is a block diagram which illustrates an example of a web system;

FIG. 4 is a figure which illustrates an example of setting information;

FIG. 5 is a figure which illustrates an example of an allocation-priority determination policy;

FIG. 6 is a figure which illustrates an example of CPU managing information;

FIG. 7 is a figure which illustrates an example of allocation priority information;

FIG. 8 is a figure which illustrates an example of updated CPU managing information;

FIG. 9 is a figure which illustrates an example of CPU managing information that is created when the number of CPU packages is less than the number of virtual machines;

FIG. 10 is a figure which illustrates an example of updated CPU managing information when the number of CPU packages is less than the number of virtual machines;

FIG. 11 is a figure which illustrates another example of updated CPU managing information when the number of CPU packages is less than the number of virtual machines;

FIG. 19 is a figure which illustrates an example of CPU managing information that is created according to the second embodiment.

FIG. 20 is a figure which illustrates an example of correctable-error-accumulated information;

FIG. 21 is a figure which illustrates an example of allocation priority information according to the second embodiment;

FIG. 22 is a figure which illustrates an example of updated CPU managing information when a failure has occurred in a CPU package according to the second embodiment;

DESCRIPTION OF EMBODIMENTS

Embodiments will now be described in detail with reference to the drawings.

Figure 2:
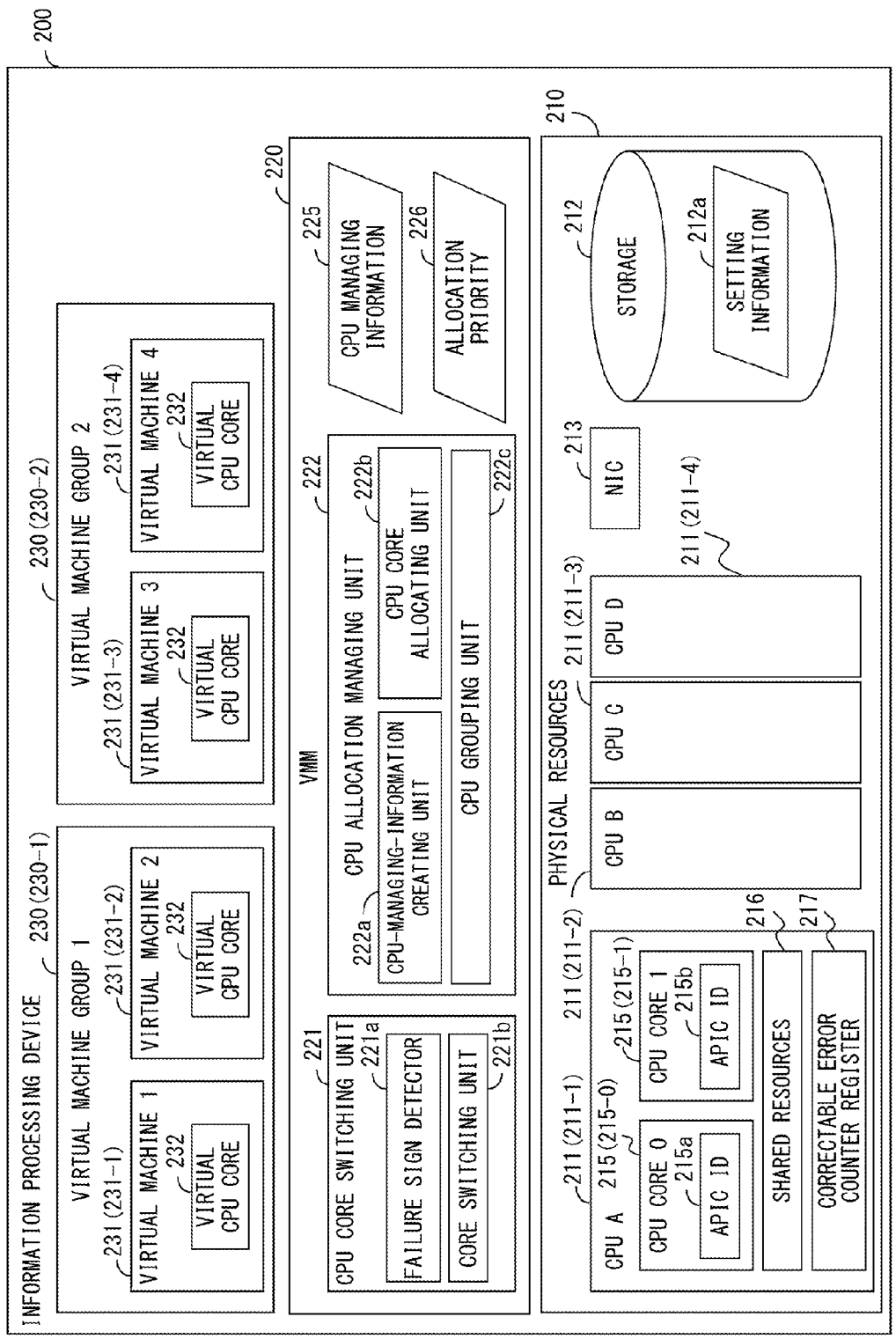
FIG. 2 is a block diagram of an example of an information processing device with examples of virtual machines created thereon according to a first embodiment.

FIG. 2 is a block diagram of an example of an information processing device with examples of virtual machines created thereon according to a present embodiment.

As illustrated in FIG. 2, an information processing device 200 according to the present embodiment includes resources 210, and a VMM 220 and four virtual machines 231 (231-1 to 231-4) operate by use of the resources 210. FIG. 2 only illustrates four CPU packages 211 (211-1 to 211-4), a storage 212, and an NIC (network interface card) 213 as the resources 210, but the resources 210 are not limited to the example in FIG. 2.

The above-mentioned storage 212 is actually a group of storages including a secondary storage such a hard disk device and a primary storage such as a memory module. In addition to setting information 212a, the storage 212 also stores therein a program that realizes the VMM 220 (hereinafter referred to as "VMM software"), and various programs to be executed on each of the virtual machines 230 (such as an OS (operating system) and an application program).

Each of the CPU packages 211 includes two CPU cores 215 (215-0 and 215-1), shared resources 216, and a correctable error counter register 217. For example, the shared resources 216 include an LLC, an interface with the storage 212, and an interface that permits communication with the other CPU packages 211. Each of the CPU cores 215 includes an APIC (advanced programmable interrupt controller) 215a that is able to generate many hardware interrupts. "APIC ID" in FIG. 2 represents identification information allocated to the APIC 215a. The "APIC ID" will hereinafter be used as an identification information allocated to the APIC 215a.

For example, the correctable error counter register 217 is a register for counting the number of correctable errors that occur in an LLC, and its value is updated by a CPU core 215 that has recognized an occurrence of a correctable error. There are a large number of correctable errors that occur per unit time before a failure occurs. Therefore, a failure sign that appears in a CPU package 211 can be detected by monitoring the value of the correctable error counter register 217.

As illustrated in FIG. 3, the four virtual machines 231 are grouped into two virtual machine groups 230 (230-1 and 230-1). Each of the virtual machine groups 230 corresponds to, for example, either of two processing systems 32 in FIG. 3. In this case, it is assumed that the virtual machine group 230-1 and the virtual machine group 230-2 correspond to a processing system 32-1 and a processing system 32-2, respectively. Further, it is assumed that the virtual machine 231-1 and the virtual machine 231-2 in the virtual machine group 230-1 operate as a virtual machine 33 and a virtual machine 34 in the processing system 32-1, respectively. Likewise, it is assumed that the virtual machine 231-3 and the virtual machine 231-4 in the virtual machine group 230-2 operate as a virtual machine 33 and a virtual machine 34 in the processing system 32-2, respectively. In FIG. 2, it is assumed that each of the virtual machines 231 is allocated one virtual CPU core 232.

As illustrated in FIG. 2, a CPU core switching unit 221 and a CPU allocation managing unit 222 are realized on the VMM 220. The CPU core switching unit 221 includes a failure sign detector 221a and a core switching unit 221b, and the CPU allocation managing unit 222 includes a CPU-managing-information creating unit 222a, a CPU core allocating unit 222b, and a CPU grouping unit 222c. Further, the VMM 220 manages CPU managing information 225 and allocation priority information 226.

The CPU core switching unit 221 is a function for newly allocating a CPU core 215 to a virtual machine 231 in operation. The failure sign detector 221a monitors the correctable error counter register 217 in each of the CPU packages 221 and detects a failure sign that appears. The core switching unit 221b refers to the allocation priority information 226, allocates a CPU core 215 to a virtual machine 231 to which a CPU core 215 is to be newly allocated, and updates the CPU managing information 225. The detailed operation of the CPU core switching unit 221 will be described below.

In many cases, a failure sign appears before a failure occurs in the CPU package 211. This permits detection of the failure sign in most situations and then allocation of a CPU core 215 to a virtual machine 231 is changed. A method for changing allocation of a CPU core 215 to a virtual machine 231 is not basically changed between when a failure occurs and when a failure sign is detected. Therefore, failure sign detection will herein be used in a sense including a failure occurrence unless otherwise specified.

The CPU allocation managing unit 222 is a function for managing allocation of a CPU core 215 when a virtual machine 231 is created (starts to operate). The CPU-managing-information creating unit 222a refers to setting information 212a, and determines the number of virtual machines 231 to be created and the number of CPU cores 215 to be allocated to the respective virtual machines 231. According to a result of the determination, the CPU-managing-information creating unit 222a selects a CPU core 215 to be allocated to each of the virtual machines 231, and creates CPU managing information 225 that represents a result of the selection.

The CPU core allocating unit 222b allocates a CPU core 215 to each of the virtual machines 231 according to the created CPU managing information 225. The CPU grouping unit 222c creates allocation priority information 226.

Next, operation of the VMM 220 will be described in more detail with reference to FIGS. 4 to 11.

FIG. 4 is a figure which illustrates an example of setting information. The setting information 212a is information for specifying, for each virtual machine 231 to be created, a resource amount that has to be allocated to a virtual machine 231 to be created. FIG. 4 only illustrates the number of CPU cores to be allocated, which is information representing the number of CPU cores 215 to be allocated that is the resource amount especially according to the present embodiment. A virtual machine number is information on identification information of a virtual machine 231, and the numbers "1" to "4" in FIG. 4 each represent virtual machine numbers that are allocated to the respective virtual machines 231-1 to 231-4.

The setting information 212a designates a group number for each virtual machine 231. The group number is identification information that is allocated to a virtual machine group 230 to which a virtual machine 231 belongs. The numbers "1" and "2" in FIG. 4 each represent group numbers that are allocated to the respective virtual machine groups 230-1 and 230-2.

FIG. 5 is a figure which illustrates an example of an allocation-priority determination policy. The allocation-priority determination policy is a rule when allocating a CPU core 215 to each virtual machine 231, and designates a priority to be set for each pattern. FIG. 5 represents priorities by any of "HIGH", "MEDIUM", or "LOW". "HIGH" represents a priority set for a CPU package 211 that has to be allocated with the highest priority.

The pattern corresponds to a state of a CPU package 211. The pattern in which "MEDIUM" or "LOW" is set as a priority is determined according to an assumed virtual machine 231. In FIG. 5, a virtual machine 231 in which the allocated CPU core 215 has to be changed is assumed as an assumed virtual machine 231, but the content is basically the same if the assumed virtual machine 231 is a virtual machine 231 to be created.

As illustrated in FIG. 5, the priority "HIGH" is set for a CPU package 211 in which a virtual machine 231 is not allocated to any of its CPU cores 215. The priority "MEDIUM" is set for a CPU package 211 in which all the virtual machines 231 allocated to its CPU cores 215 have the same group number and that group number is identical to a group number of an assumed virtual machine 231. The priority "LOW" is set for a CPU package 211 in which at least one of the group numbers of the virtual machines 231 allocated to its CPU cores 215 is not identical to the group number of the assumed virtual machine 231.

The allocation-priority determination policy in FIG. 5 is applied to the CPU core allocating unit 222b and the CPU grouping unit 222c. The CPU-managing-information creating unit 222a creates the CPU managing information 225 for a portion that is not related to the allocation-priority determination policy. Accordingly, each virtual machine 231 to be created and a virtual machine 231 in which the allocated CPU core 215 is to be changed are allocated CPU cores 215 according to the allocation-priority determination policy in FIG. 5.

FIG. 6 is a figure which illustrates an example of CPU managing information. As illustrated in FIG. 6, the CPU managing information 225 stores therein a core managing number, position information, information on a virtual machine to be allocated to, and a non-allocation flag for each CPU core 215.

The core managing number is identification information that is allocated so as to manage a CPU core 215. The numbers "1" to "8" in FIG. 6 are examples of core managing numbers. The position information represents a position in which a CPU core 215 that has been allocated a core managing number is located. A "CPU package number" illustrated as the position information represents an identification number (different from a serial number that will be described below) of a CPU package 211 provided with a corresponding CPU core 215. "A" to "D" illustrated as an example of the CPU package number represent CPU packages 211-1 to 211-4, respectively. A "CPU core number" illustrated as the position information represents an identification number within a CPU package 211 provided with a corresponding CPU core 215. "0" and "1" illustrated as an example of the CPU core number represent CPU cores 215-0 and 215-1, respectively.

The information on a virtual machine to be allocated to is information that represents a virtual machine 231 to which a corresponding CPU core 215 has been allocated. "VIRTUAL MACHINE 1" to "VIRTUAL MACHINE 4" illustrated as an example of the information represent virtual machines 231-1 to 231-4, respectively.

A virtual machine 231 is not allowed to be allocated to a CPU package 211 in which a failure has occurred and a CPU package 211 in which a failure sign has been detected. The non-allocation flag is information for preventing allocation of a virtual machine 231 to such a CPU package 211. "No" illustrated as an example of the non-allocation flag denotes that allocation to a virtual machine 231 is allowed. The non-allocation flag of the CPU package 211 that is not allowed to be allocated to a virtual machine 231 is updated from "No" to "Yes".

As illustrated in FIG. 4, the number of CPU cores 215 to be allocated to each virtual machine 231 is one, and the information processing device 200 is provided with four CPU packages 211. Thus, eventually, the CPU managing information 225 that gives instructions to allocate a virtual machine 231 to one CPU core 215 for each CPU package 211 is created according to the allocation-priority determination policy in FIG. 5, as illustrated in FIG. 6.

FIG. 7 is a figure which illustrates an example of allocation priority information.

Allocation priority information 226 represents a priority when newly allocating a CPU core 215 to a virtual machine 231 for each CPU package 211. As illustrated in FIG. 7, the allocation priority information 226 stores therein a package number and a priority for each CPU package 211.

The priority varies according to a virtual machine 231 to be assumed, as described above. Thus, the CPU grouping unit 222c creates allocation priority information 226 for each virtual machine 231 to be assumed. The allocation priority information 226 in FIG. 7 illustrates an example when a virtual machine 231-1 or 231-2 is assumed.

FIG. 8 is a figure which illustrates an example of updated CPU managing information.

The CPU managing information 225 is used to confirm the CPU cores 215 allocated to the respective created virtual machines 231. Thus, the CPU managing information 225 is updated when allocation of a CPU core to a virtual machine is changed. The CPU managing information 225 in FIG. 8 illustrates an example when allocation of a CPU core 215 to the virtual machine 231-1 is changed from the CPU core 215-0 in the CPU package 211-1 to the CPU core 215-1 in the CPU package 211-2. This change in allocation is made due to a failure that has occurred in the CPU package 211-1 or detection of a failure sign that has appeared in the CPU package 211-1. Accordingly, the non-allocation flag of each of the CPU cores 215 in the CPU package 211-1 has been updated from "No" to "Yes".

When a change in allocation of a CPU core 215 to the virtual machine 231-1 has been made as the example in FIG. 8, at least one of the two processing systems 32 is able to continue to operate even if a failure occurs in any of the CPU packages 211-2 to 211-4. This means that the change in allocation of a CPU core 215 to the virtual machine 231-1 is optimally made in order to further prevent a decrease in operation performance of the information processing device 200 even if a failure occurs subsequently.

Even if the number of CPU cores 215 to be allocated to each virtual machine 231 is one, different CPU packages 211 are not allowed to be allocated to each virtual machine 231 when the number of CPU packages 211 that are provided in the information processing device 200 is less than the number of virtual machines 231. In the example of FIG. 2, different virtual machines 231 have to be allocated to respective CPU cores 215 included in the same CPU package 211. When the number of CPU packages 211 that are provided with the information processing device 200 is three, the example of the CPU managing information 225 in FIG. 9 is created by the CPU-managing-information creating unit 222a and the CPU core allocating unit 222b, for example. The CPU managing information 225 illustrated as an example in FIG. 9 designates allocation of the two virtual machines 231-3 and 231-4 that belong to the same virtual machine group 230 to the CPU cores 215-0 and 215-1 in the CPU package 211-3, respectively.

When a failure occurs or a failure sign is detected in the CPU package 211-1 after a CPU core 215 is allocated to each of the virtual machines 231 according to the example of the CPU managing information 225 in FIG. 9, the CPU managing information 225 is updated as illustrated in FIG. 10. When it has been updated to the example in FIG. 10, one of the two processing systems 32 is able to continue to operate even if a failure occurs in either of the CPU package 211-2 or 211-3. This permits continuation of the operation of the information processing device 200 even if a failure occurs.

When a failure occurs or a failure sign is detected in the CPU package 211-3 after a CPU core 215 is allocated to each of the virtual machines 231 according to the example of the CPU managing information 225 in FIG. 9, the CPU managing information 225 is updated as illustrated in FIG. 11. When it has been updated to the example in FIG. 11, the two processing systems 32 both stop their operations due to a failure occurrence or a failure sign detection in either of the CPU packages 211-1 or 211-2.

As described above, even if a CPU package 211 that is a resource does not have enough capacity, the same CPU package 211 is prioritized when allocating CPU cores 215 to virtual machines 231 that belong to the same virtual machine group 230. As a result, an operable virtual machine 231 remains in an optimal state. This permits prevention of any influence of a failure occurrence.

Next, operation of the VMM 220 will be described in detail with reference to the flowcharts in FIGS. 12 to 17.

Figure 12:
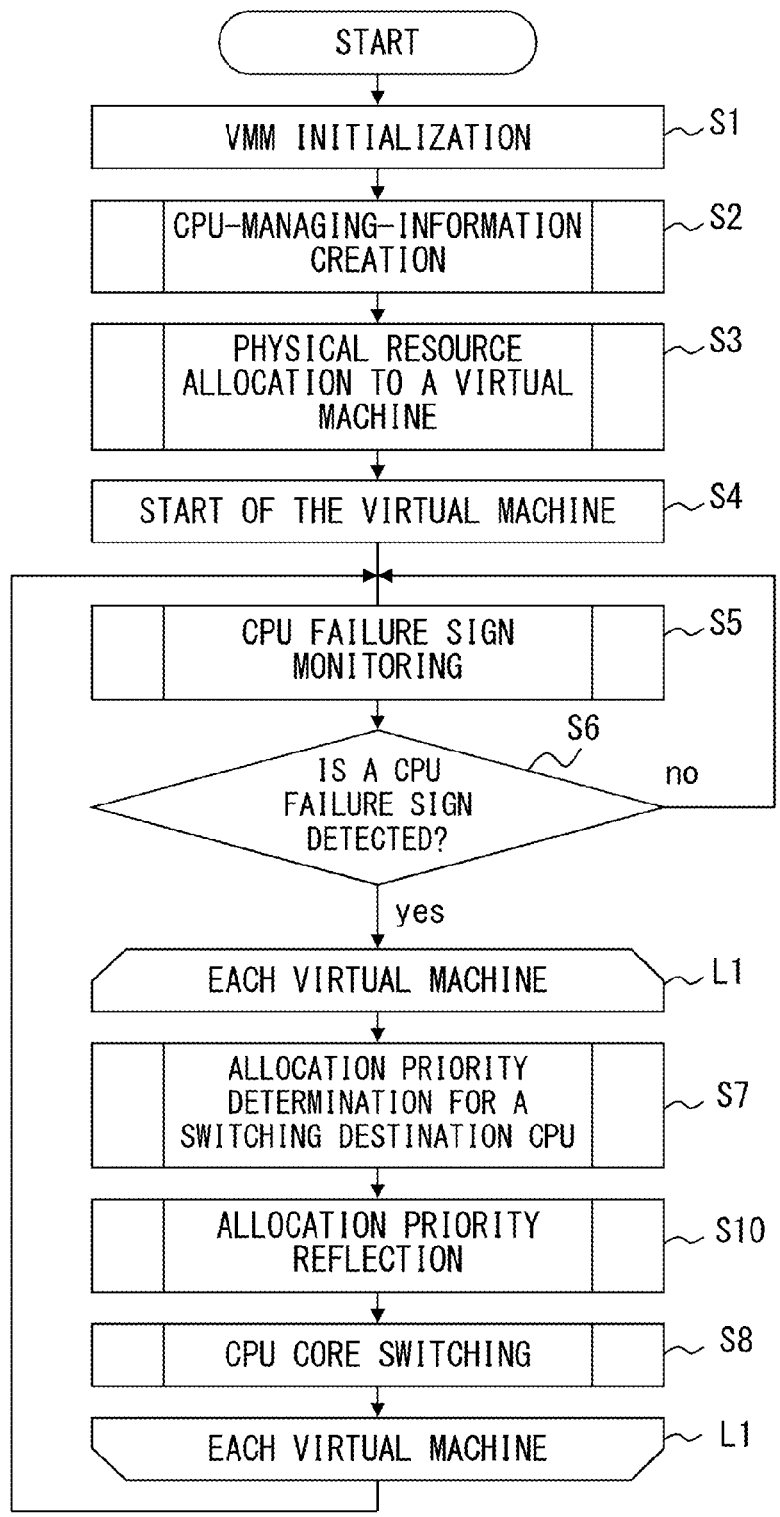
FIG. 12 is a flowchart of overall processing that is performed by the VMM.

FIG. 12 is a flowchart of overall processing that is performed by the VMM. The processes performed by the VMM 220 for allocating resources 210 to virtual machines 231 are picked up, and the overall processing represents a flow of the picked up processes. First, the overall processing will be described in detail with reference to FIG. 12.

Normally, the CPU cores 215 (CPU package 211) that have been allocated to the respective virtual machines 231 are allocated to the VMM 220 so as to control each of the virtual machines 231. VMM software that realizes the VMM 220 is executed by a CPU core 215 of a CPU package 211. Thus, the CPU core 215 is assumed as an element that performs the processing.

FIG. 12 also describes a processing step performed only in a second embodiment that will be described below. Such a processing step is S10. Thus, in the first embodiment, the process moves on to S8 after the end of S7.

When starting execution by retrieving the VMM software from the storage 212, first, the CPU core 215 performs initialization (S1). Then, the CPU core 215 performs CPU-managing-information creation process to create CPU managing information 225 (S2).

Figure 13:
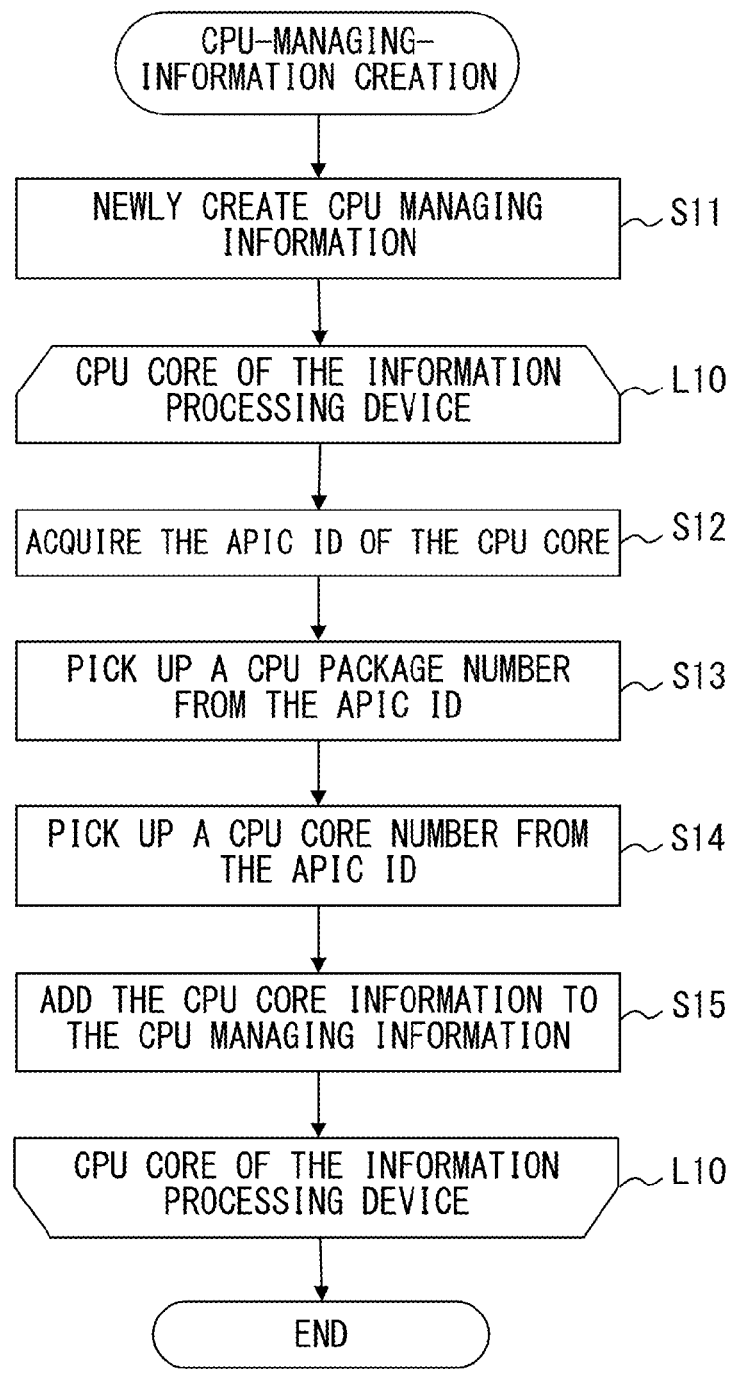
FIG. 13 is a flowchart of CPU-managing-information creation process.

FIG. 13 is a flowchart of a CPU-managing-information creation process. Referring to FIG. 13, the CPU-managing-information creation process will now be described in detail.

First, the CPU core 215 creates new CPU managing information 225, and stores the created CPU managing information 225 in an area reserved in the storage 212 (S11). After that, the CPU 215 acquires an APIC ID from each CPU core 215 in each CPU package 211 that is provided in the information processing device 200, and performs a processing loop L10 to store the information in the acquired APIC ID in the CPU managing information 225.

The APIC ID is identification information that is formed by a plurality of bits. The APIC ID includes a bit string that represents a CPU package number, and a bit string that represents a CPU core number. The CPU package number and the CPU core number are information to be extracted from the APIC ID.

In the processing loop L10, first, the CPU core 215 selects a CPU package 211 whose information has to be acquired and a target CPU core 215 in the CPU package 211, and acquires the ID from the APIC 215 of the selected CPU core 215 (S12). Next, the CPU core 215 picks up a CPU package number from the acquired APIC ID (S13) and further picks up a CPU core number from the APIC ID (S14). The CPU core 215 allocates core managing numbers to the CPU package number and the CPU core number that have been picked up in that way, and stores in the CPU managing information 225 the core managing numbers, and the CPU package number and the CPU core number that are position information (S15). When the CPU managing information 225 is a table, the core managing numbers and the position information are stored by adding one entry and storing the core managing numbers and the position information in the added entry.

When there is not any other CPU core 215 left whose APIC ID has to be acquired after the core managing numbers and the position information are stored, the processing loop L10 ends, and then the CPU-managing-information creation process ends with the end of the processing loop L10. When there is any other CPU core 215 left whose APIC ID has to be acquired, the process returns to S12, and a CPU core 215 whose APIC ID has to be acquired is selected and an APIC ID is acquired from the selected CPU core 215. Accordingly, the processing loop L10 continues to be performed. The CPU-managing-information creating unit 222a in FIG. 2 is realized by a CPU core 215 performing the CPU-managing-information creation process.

Return to FIG. 12.

The process moves on to S3 after the above-mentioned CPU-managing-information creation process. In S3, the CPU core 215 performs processing of allocating the resources 210 to respective virtual machines 231 to be created.

Figure 14:
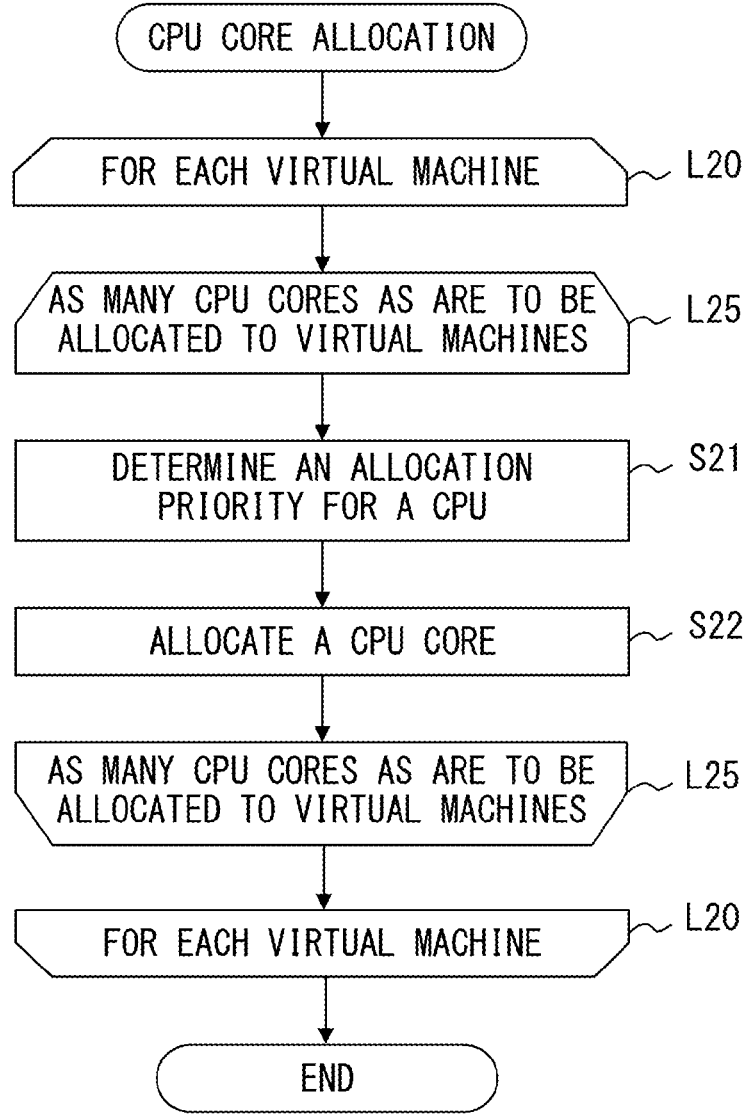
FIG. 14 is a flowchart of CPU core allocation.

FIG. 14 is a flowchart of CPU core allocation. The CPU core allocation is processing that is performed in S3 so as to allocate a CPU core 215 to each virtual machine 231 to be created. The CPU core allocating unit 222b in FIG. 2 is realized by a CPU core 215 performing the CPU core allocation. Referring now to FIG. 14, the CPU core allocation will be described in detail.

A processing loop L20 is formed in the CPU core allocation so as to allocate a CPU core 215 to each virtual machine. In the processing loop L20, a processing loop L25 is formed to find as many CPU cores 215 as are to be allocated to the virtual machines 231 targeted in the processing loop L20 and to perform allocation. In order to allocate as many CPU cores 215 as are to be allocated to each of the virtual machines 231, the CPU managing information 225 and the setting information 212a are referred to.

In the processing loop L25, first, the CPU core 215 refers to the setting information 212a and the CPU managing information 225, and determines a priority for each CPU core 215 that has not been allocated a virtual machine 231 (S21). The determination of a priority is performed according to the allocation-priority determination policy in FIG. 5.

After a priority for each of the CPU cores 215 is determined, the CPU core 215 allocates a CPU core 215 with the highest priority from among the given priorities to a target virtual machine 231, and reflects a result of the allocation in the CPU managing information 225 (S22).

In this way, one CPU core 215 is allocated to a target virtual machine 231. When the target virtual machine 231 has to be allocated a further CPU core 215, the process returns to S21 mentioned above, and a priority is newly determined. When the target virtual machine 231 does not have to be allocated any further CPU core 215, the processing loop 25 ends and the process moves on to the processing loop L20.

After the process moves onto the processing loop L20, when there is any other virtual machine 231 to which a CPU core 215 has to be allocated, the other virtual machine 231 is selected as a target. When there is not any other virtual machine 231 to which a CPU core 215 has to be allocated, the processing loop L20 ends and then the CPU core allocation ends with the end of the processing loop L20.

Return to FIG. 12.

The allocation of the resources 210 to all the virtual machines 231 to be created is completed by performing S3 that includes the above-mentioned CPU core allocation. In S4, which is the process after S3 is performed, the CPU core 215 starts all the created virtual machines 231.

After starting all the created virtual machines 231, the CPU core 215 then performs CPU failure sign monitoring process to detect a failure sign that appears in each CPU package (S5).

Figure 15:
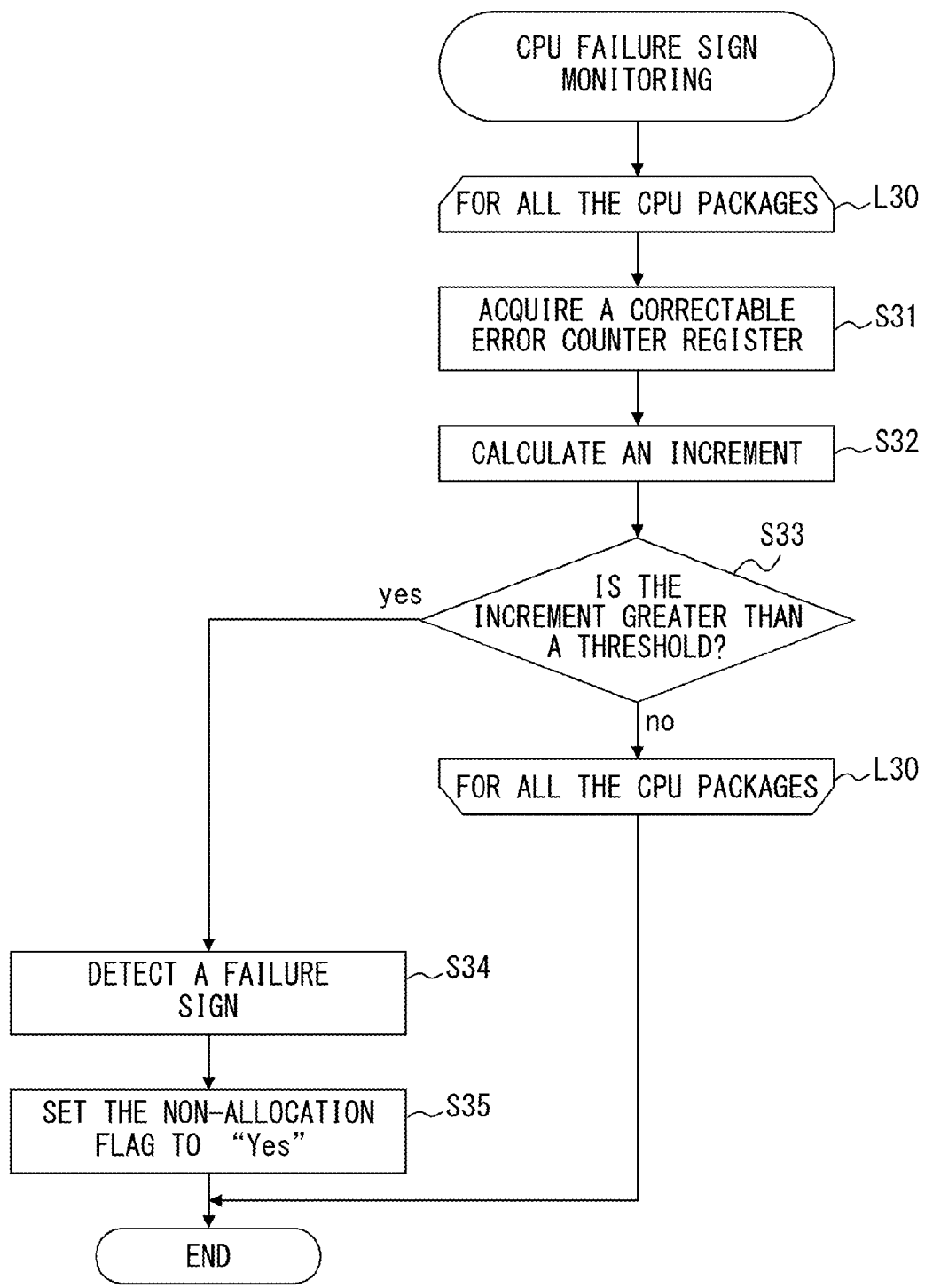
FIG. 15 is a flowchart of CPU failure sign monitoring process.

FIG. 15 is a flowchart of CPU failure sign monitoring process. Referring now to FIG. 15, the CPU failure sign monitoring process will be described in detail.

As described above, a failure sign that appears in a CPU package 211 is detected by monitoring the value of the correctable error counter register 217. In the first embodiment, it is determined that a failure sign has appeared when the number of correctable errors that occur per unit time exceeds a threshold. Thus, the CPU failure sign monitoring process is performed, for example, every time a certain time period elapses.

In the CPU failure sign monitoring process, first, a processing loop L30 is performed for each CPU package 211 to detect a failure sign that has appeared.

In the processing loop L30, first, the CPU core 215 makes a request of a target CPU package 211 and acquires the value of the correctable error counter register 217 (S31). Then, the CPU core 215 calculates an increment given by an elapse of a certain time period by subtracting from the value a previously acquired value, and saves a newly-acquired value (S32). After that, the CPU core 215 determines whether the increment is greater than the above-mentioned threshold (S33). When the calculated increment is greater than the threshold, it is determined to be yes in S33 and the process moves on to S34. When the calculated increment is not greater than the threshold, it is determined to be no in S33, and the series of processing in the processing loop L30 ends.

The processing loop L30 whose series of processing has ended ends when there is not any other CPU package 211 to be targeted. When there is any other CPU package 211 to be targeted left, the processing loop L30 sets the remaining CPU package 211 as a target, and the process returns to S31 mentioned above. Accordingly, the processing loop L30 continues to be performed.

In S34, the CPU core 215 determines that a failure sign has been detected. Accordingly, the CPU core 215 updates the non-allocation flag of the target CPU package 211 in the CPU managing information 225 from "No" to "Yes". After that, the CPU failure sign monitoring process ends.

In the first embodiment, the CPU failure sign monitoring process ends when a failure sign is detected, as described above. The reasons for this are that failure signs are much less likely to appear in a plurality of CPU packages 211 at one time and that the object is to allocate another CPU core 215 more quickly to a virtual machine 231 that uses a CPU core 215 in a CPU package 211 in which a failure sign has appeared.

Return to FIG. 12.

When the above-mentioned CPU failure sign monitoring process is completed, the CPU core 215 then determines whether a failure sign is detected in the CPU package 211 (S6). When a non-allocation flag of any of the CPU packages 211 represented in the CPU managing information 225 is updated from "No" to "Yes", it is determined to be yes in S6 and the process moves on to a processing loop L1. When there is not any CPU package 211 whose non-allocation flag has been updated from "No" to "Yes", it is determined to be no in S6. In this case, the process moves on to S5 after an elapse of a certain time period, and the CPU failure sign monitoring process is again performed.

In the above-mentioned processing loop L1, for each virtual machine 231 that uses a CPU core 215 in a CPU package 211 in which a failure sign has been detected, a series of processing to allocate another CPU core 215 to the virtual machine 231 is performed.

First, the CPU core 215 selects one virtual machine 231 that uses a CPU core 215 in a CPU package 211 in which a failure sign has been detected, and performs an allocation priority determination process to create allocation priority information 226 assuming the selected virtual machine 231 (S7). Then, the CPU core 215 refers to the created allocation priority information 226 and the CPU managing information 225, and performs CPU core switching process to change the CPU core 215 that is allocated to the assumed virtual machine 231 (S8).

The series of processing in the processing loop L1 ends with the end of the CPU core switching process. Accordingly, when there is not any other virtual machine 231 in which the allocation of the CPU core 215 has to be changed, the processing loop L1 ends, and the process returns to S5 mentioned above after an elapse of a certain time period. When there is any other virtual machine 231 in which the allocation of the CPU core 215 has to be changed, the process returns to S7 mentioned above.

Figure 16:
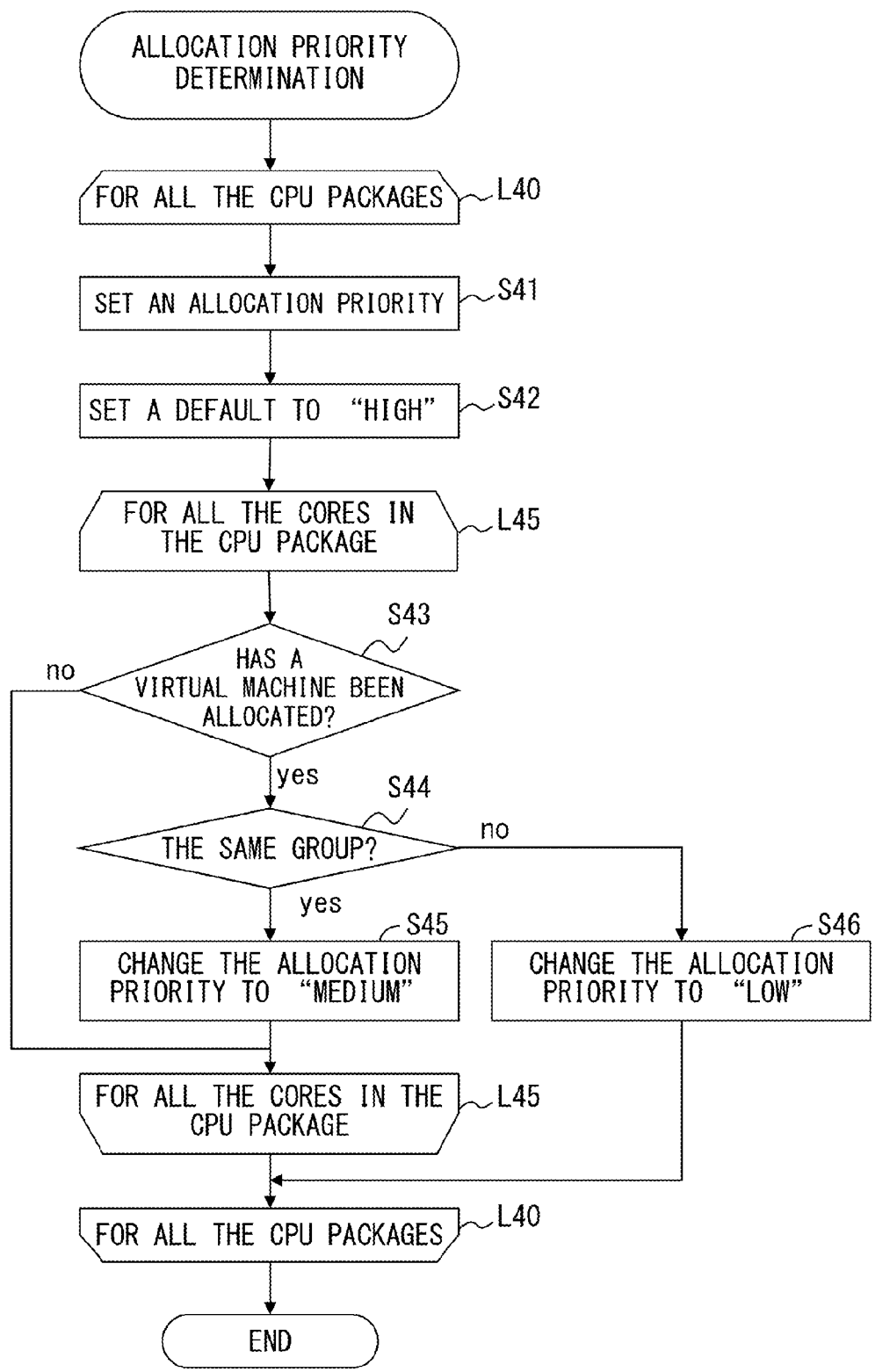
FIG. 16 is a flowchart of allocation priority determination process.

FIG. 16 is a flowchart of allocation priority determination process that is performed as S7 mentioned above. Referring now to FIG. 16, the allocation priority determination process will be described in detail.

In the allocation priority determination process, a processing loop L40 is performed to determine a priority for each CPU package 211. In the processing loop L40, first, the CPU core 215 sets a priority for a target CPU package 211 (S41). Then, the CPU core 215 stores "HIGH" as a set priority (default) in each entry of the allocation priority information 226 (S42). After the storing of the default, the process moves on to a processing loop L45.

In the processing loop L45, processing to set a priority to be set is performed for each of the CPU cores 215 that are provided in the target CPU package 211.

First, the CPU core 215 refers to the CPU managing information 225 and determines whether a virtual machine 231 has already been allocated to the target CPU core 215 (S43). When a virtual machine 231 has been allocated to the target CPU core 215, it is determined to be yes in S43 and the process moves on to S44. When a virtual machine 231 has not been allocated to the target CPU core 215, it is determined to be no in S43, and the series of processing in the processing loop L45 ends.

In S44, the CPU core 215 refers to the setting information 212a and determines whether the virtual machine group 230 to which the virtual machine 231 using the target CPU core 215 belongs is the same as the virtual machine group 230 to which the assumed virtual machine 231 belongs. When those virtual machine groups 230 are the same, it is determined to be yes in S44. Accordingly, the CPU core 215 changes the priority for the target CPU package 211 to "MEDIUM" (S45). After that, the series of processing in the processing loop L45 ends. On the other hand, when those virtual machine groups 230 are not the same, it is determined to be no in S44. Accordingly, the CPU core 215 changes the priority for the target CPU package 211 to "LOW" (S46). After that, the series of processing in the processing loop L45 ends.

When there is not any other CPU core 215 to be targeted, the processing loop L45 whose series of processing has ended ends, and the process returns to the processing loop L40. When there is any other CPU core 215 to be targeted, the process returns to S43 mentioned above, and processing on the other CPU core 215 is performed.

After the process moves onto the processing loop L40, when there is not any other CPU package 211 to be targeted, the processing loop L40 ends and then the allocation priority determination process ends with the end of the processing loop L40. When there is any other CPU package 211 to be targeted, the process returns to S41 mentioned above, and processing on the other CPU core 211 is performed.

The priority for the target CPU package 211 is determined according to the allocation-priority determination policy in FIG. 5 by performing the processing loop L45. Accordingly, the virtual machine 231 in which the allocation of the CPU core 215 has to be changed is newly allocated a CPU core 215 that has optimal resistance to a failure that occurs in the CPU package 211 and to detection of a failure sign. The CPU grouping unit 222c in FIG. 2 is realized by a CPU core 215 performing the allocation priority determination process.

Figure 17:
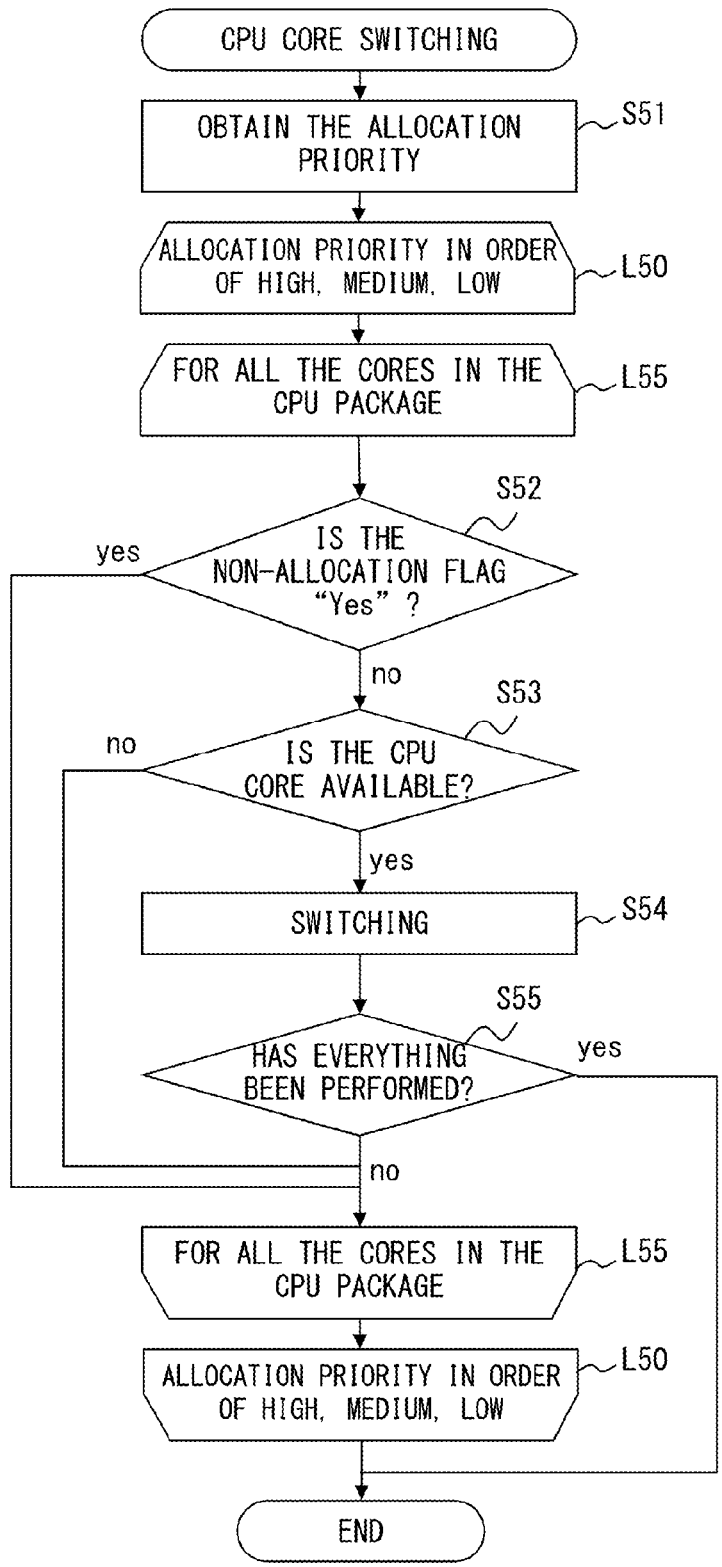
FIG. 17 is a flowchart of CPU core switching process.

FIG. 17 is a flowchart of CPU core switching process that is performed as S8 mentioned above. Finally, referring to FIG. 17, the CPU core switching process will be described in detail. The CPU core switching unit 221b in FIG. 2 is realized by a CPU core 215 performing the CPU core switching process. The virtual machine 231 to be targeted is the virtual machine 231 that has been selected as a target in the processing loop L1 in FIG. 12.

In the CPU core switching process, first, the CPU core 215 acquires the allocation priority information 226 that has been created by performing the allocation priority determination process in S7 that is the latest step, and the CPU managing information 225 (S51). After that, the CPU core 215 performs a processing loop L50.

For each priority, the processing loop L50 permits finding of a CPU core 215 that can be allocated, from among the CPU cores 215 in the CPU package 211 to which a target priority is allocated, and allocating of the found CPU core 215 to the target virtual machine 231. A processing loop L55 performed in the processing loop L50 is for the CPU core 215 in the CPU package 211 to which the target priority is allocated.

In the processing loop L55, first, the CPU core 215 selects one of the CPU cores 215 in the CPU package 211 to which the target priority is allocated, and determines whether the non-allocation flag of the selected CPU core 215 is "Yes" (S52). When the non-allocation flag is "Yes", it is determined to be yes in S52, and the series of processing in the processing loop L55 ends here. When the non-allocation flag is "No", it is determined to be no in S52 and the process moves on to S53.

In S53, the CPU core 215 determines whether the selected CPU core 215 is available. When the selected CPU core 215 has been allocated to any of the virtual machines 231, it is determined to be no in S53, and the series of processing in the processing loop L55 ends here. When the selected CPU core 215 has not been allocated to any of the virtual machines 231, it is determined to be yes in S53 and the process moves on to S54.

In S54, the CPU core 215 newly allocates the selected CPU core 215 to the target virtual machine 231. Then, the CPU core 215 determines whether as many CPU cores 215 as are to be newly allocated to target virtual machines 231 have been already allocated (S55). When as many CPU cores 215 as are to be newly allocated to target virtual machines 231 have been allocated, it is determined to be yes in S55, and the CPU core switching process ends here. When there is any CPU core 215 to be newly allocated to a target virtual machine 231, it is determined to be no in S55, and the series of processing in the processing loop L55 ends here.

The processing loop L55 whose series of processing has ended ends when there is not any other CPU core 215 to be targeted, and the process returns to the processing loop L50. When there is any other CPU core 215 to be targeted, the process returns to S52 mentioned above, and processing on the other CPU core 215 is performed.

After the process moves onto the processing loop L50, when there is not any other CPU package 211 to be targeted, the processing loop L50 ends and then the CPU core switching process ends with the end of the processing loop L50. When there is any other CPU package 211 to be targeted, the process returns to S52 mentioned above after the other CPU package 211 is selected as a target in the processing loop L55.

The other target CPU package 211 is selected from among the CPU packages 211 for which the same priority as the target priority has been set. When there is not any CPU package 211 for which the same priority as the target priority has been set and that has not been targeted, a next lower priority than the target priority is newly selected as a target. Accordingly, the other target CPU package 211 is selected from among the CPU packages 211 for which the same priority as the new target priority has been set.

Second Embodiment

Figure 18:
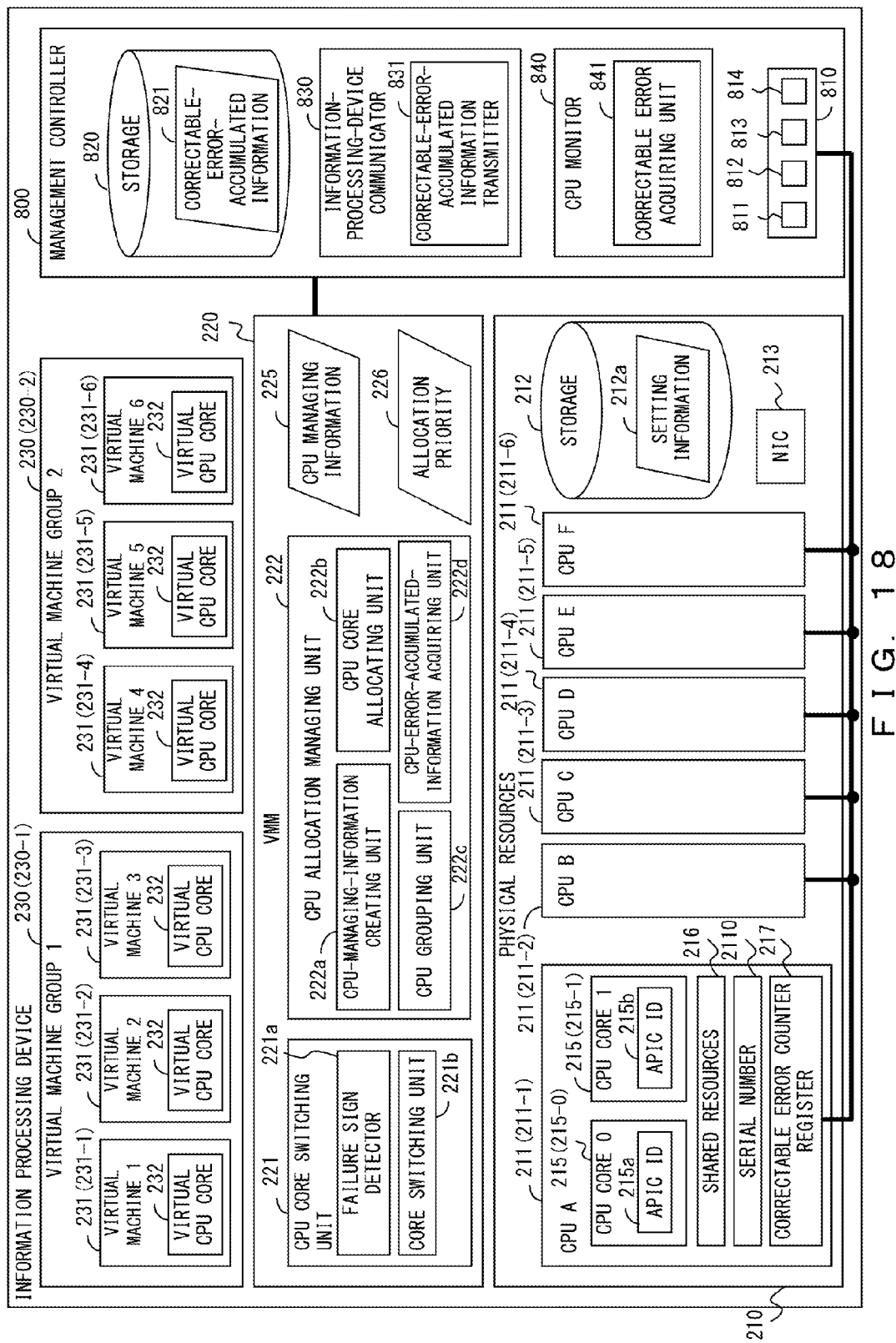
FIG. 18 is a block diagram of an example of an information processing device with examples of virtual machines created thereon according to a second embodiment.

FIG. 18 is a block diagram of an example of an information processing device with examples of virtual machines created thereon according to a second embodiment.

The configuration of the information processing device according to the second embodiment is largely the same as that of the information processing device 200 according to the first embodiment. Further, a virtual machine created on the information processing device according to the second embodiment does not have to be distinguished from a virtual machine 231 created on the information processing device 200 according to the first embodiment. The operation of the VMM that operates on the information processing device according to the second embodiment is largely the same as the VMM that operates on the information processing device 200 according to the first embodiment. For that reason, differences from the first embodiment will now be described.

In the second embodiment, as illustrated in FIG. 18, resources 210 in the information processing device 200 include six CPU packages 211 (211-1 to 211-6). In the second embodiment, a serial number that is an identification information of a CPU package 211 stored in a register 2110 included in the CPU package 211 is used to perform processing.

In the second embodiment, six virtual machines 231 in total (231-1 to 231-6) are created on the information processing device 200. Among the six virtual machines 231, three virtual machines 231-1 to 231-3 belong to the virtual machine group 230-1, and the other three virtual machines 231-4 to 231-6 belong to the virtual machine group 230-2. It is assumed that each of the virtual machine groups 230 corresponds to either of the two processing systems 32 in FIG. 3, as in the first embodiment. On the basis of that assumption, two of the three virtual machines 231 may be used as an AP server 34.

FIG. 19 is a figure which illustrates an example of CPU managing information that is created according to the second embodiment.

Also in the second embodiment, it is assumed that one CPU core 215 is allocated to each virtual machine 231. The number of CPU packages 211 provided in the information processing device 200 is six. Thus, as illustrated in FIG. 19, it is understood from the CPU managing information 225 to be created that a virtual machine 231 is allocated to only one CPU core 215 for each CPU package 211.

A management controller 800 is a management device that is used for management of a virtual machine 231. The management controller 800 includes resources 810 such as a CPU 811, a memory (memory module) 812, a flash memory 813, and an interface 814 that permits communication with each CPU package 211.

On the management controller 800, a storage 820, an information-processing-device communicator 830, and a CPU monitor 840 are realized.

The storage 820 is realized by, for example, at least one of the memory 812 and the flash memory 813. The storage 820 stores therein correctable-error-accumulated information 821. The information-processing-device communicator 830 is, for example, the interface 814.

FIG. 20 is a figure which illustrates an example of correctable-error-accumulated information.

The correctable-error-accumulated information 821 is information for knowing a frequency of an occurrence of a correctable error in each CPU package 211. As illustrated in FIG. 20, for each CPU package 211, the correctable-error-accumulated information 821 stores therein a serial number and error-accumulated-value information that represents an accumulated value of a correctable error that has occurred. For the accumulated value represented by error-accumulated-value information of each CPU package 211, all the accumulated values are from the same timing as one another, so as to perform an appropriate comparison between each CPU package 211.

The CPU package 211 provided in the information processing device 200 is normally exchangeable. In the second embodiment, a serial number is stored in the correctable-error-accumulated information 821 so as to determine whether the CPU package 211 has been changed.

The CPU monitor 840 monitors each of the CPU packages 211, and deals with a failure that occurs in any of the CPU packages 211. The CPU monitor 840 includes a correctable error acquiring unit 841. The correctable error acquiring unit 841 regularly acquires a value of the correctable error counter register 217 from each of the CPU packages 211, calculates an increment by subtracting from the acquired value a previously acquired value, and updates the correctable-error-accumulated information 821 by use of the calculated increment. That updating is performed by changing the accumulated value represented by each error-accumulated-value information to the value obtained by adding the increment to the accumulated value until that time.

The correctable error acquiring unit 841 acquires a serial number stored in the register 2110 before acquiring the value of the correctable error counter register 217, and confirms whether the acquired serial number exists in the correctable-error-accumulated information 821. Accordingly, when it has been confirmed that a serial number that does not exist in the correctable-error-accumulated information 821 has been obtained, the correctable error acquiring unit 841 clears all the error-accumulated-value information stored in the correctable-error-accumulated information 821. In a state in which all the error-accumulated-value information has been reset, the correctable error acquiring unit 841 stores each error-accumulated-value information and updates the stored information.

In FIG. 18, the management controller 800 is connected to each of the CPU packages 211 and to the VMM 220 with lines. The reason is that each of the CPU packages 211 is a communication target from among the components of the resources 210, and the VMM 220 is a communication target from among each of the virtual machines 231 and the VMM 220.

Generally, the information processing device 200 in which a virtual machine 231 is created is provided with a BMC (baseboard management controller) that manages the whole information processing device 200. The BMC monitors the state of each of the CPU packages 211 that are provided in the information processing device 200, and performs needed processing. Thus, the above-mentioned management controller 800 may be provided in the information processing device 200 as a dedicated management device, or may be realized on a processing device that is already provided in the information processing device 200. The management controller 800 may be placed outside the information processing device 200.

In the second embodiment, a CPU-accumulated-information acquiring unit 222d is added to the CPU allocation managing unit 222 of the VMM 220. The CPU-accumulated-information acquiring unit 222d acquires correctable-error-accumulated information 821 from the management controller 800, and reflects the acquired correctable-error-accumulated information 821 in the allocation priority information 226.

FIG. 21 is a figure which illustrates an example of allocation priority information according to the second embodiment. FIG. 21 illustrates an example in which a failure has occurred in any of the CPU packages 211-1 to 211-3 or a failure sign has been detected.

In the first embodiment, as illustrated in FIG. 7, the allocation priority information 226 stores therein a package number and a priority for each CPU package 211. In the second embodiment, as illustrated in FIG. 21, it further stores therein error-accumulated-value information. Accordingly, a reflection by the CPU-accumulated-information acquiring unit 222d in the allocation priority information 226 is performed by overwriting corresponding pieces of error-accumulated-value information with the respective pieces of error-accumulated-value information in the acquired correctable-error-accumulated information 821.

As in the first embodiment, the allocation priority information 226 is created when a CPU core 215 to be allocated to a virtual machine 231 is changed. Thus, also in the second embodiment, the core switching unit 221b in the CPU core switching unit 221 refers to the allocation priority information 226, and newly allocates a CPU core 215 to a virtual machine 231 for which the allocation of the CPU core 215 has to be changed.

As in the first embodiment, when a CPU core 215 is allocated, a CPU core 215 in a CPU package 211 with a higher priority is prioritized. When there are a plurality of CPU packages 211 that are given the same priority, a CPU package 211 whose accumulated value represented by error-accumulated-value information is smaller is prioritized when allocating a CPU core 215. Accordingly, in the second embodiment, a CPU core 215 is newly allocated to a virtual machine 231 prioritizing a CPU package 211 with a higher priority and in which fewer correctable errors occur.

Using a CPU package 211 in which fewer correctable errors occur is more likely to extend the time until a failure occurs or a failure sign is detected. Thus, if the allocation of a CPU core 215 in a CPU package 211 in which fewer correctable errors occur is prioritized, a time period during which all virtual machines 231 can operate stably can be more likely to be longer.

FIG. 22 is a figure which illustrates an example of updated CPU managing information when a failure has occurred in a CPU package according to the second embodiment. FIG. 22 illustrates an example of updating when a failure has occurred in the CPU package 211-1.

As illustrated in FIG. 19, the virtual machine 231-1 is allocated to the CPU core 215-0 in the CPU package 211-1. When a failure has occurred in the CPU package 211-1 or a failure sign has been detected, allocation priority information 226 like the example in FIG. 21 is created. A CPU core 215 to be newly allocated to the virtual machine 231-1 is determined by referring to the created allocation priority information 226 and the CPU managing information 225. In this case, in the CPU managing information 225, the non-allocation flags for each of the CPU cores 215 in the CPU package 211-1 are "Yes". Thus, from among the two CPU packages 211-2 and 211-3 that are given the priority "MEDIUM", the CPU core 215-1 in the CPU package 211-3 whose accumulated value represented by error-accumulated-value information is smaller is newly allocated to the virtual machine 231-1. As a result, the CPU managing information 225 is updated from the content in FIG. 19 to the content in FIG. 22.

In the second embodiment, an error accumulated value is used as information that represents a state of each CPU package 211, but other information may be used. A plurality of pieces of information may be used. The total uptime in a CPU package 211, the temperature of the CPU package 211 (and a change in this), and a load are examples of the other information that can be used.

The above-mentioned error accumulated value varies by usage states of CPU packages 211 such as the number of the allocated virtual machines 231, their types, and uptimes. Thus, an actually-used error accumulated value is preferably normalized according to a difference in usage state of each of the CPU packages 211.

Figure 23:
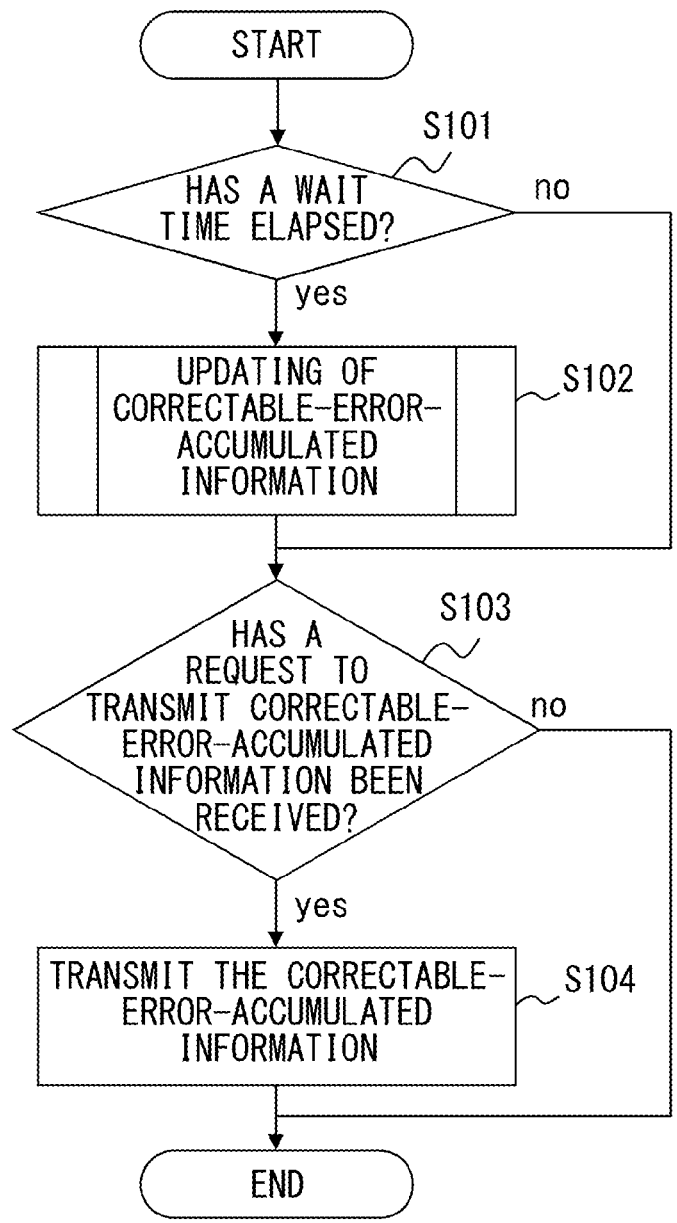
FIG. 23 is a flowchart of overall processing that is performed by a management controller.
Figure 24:
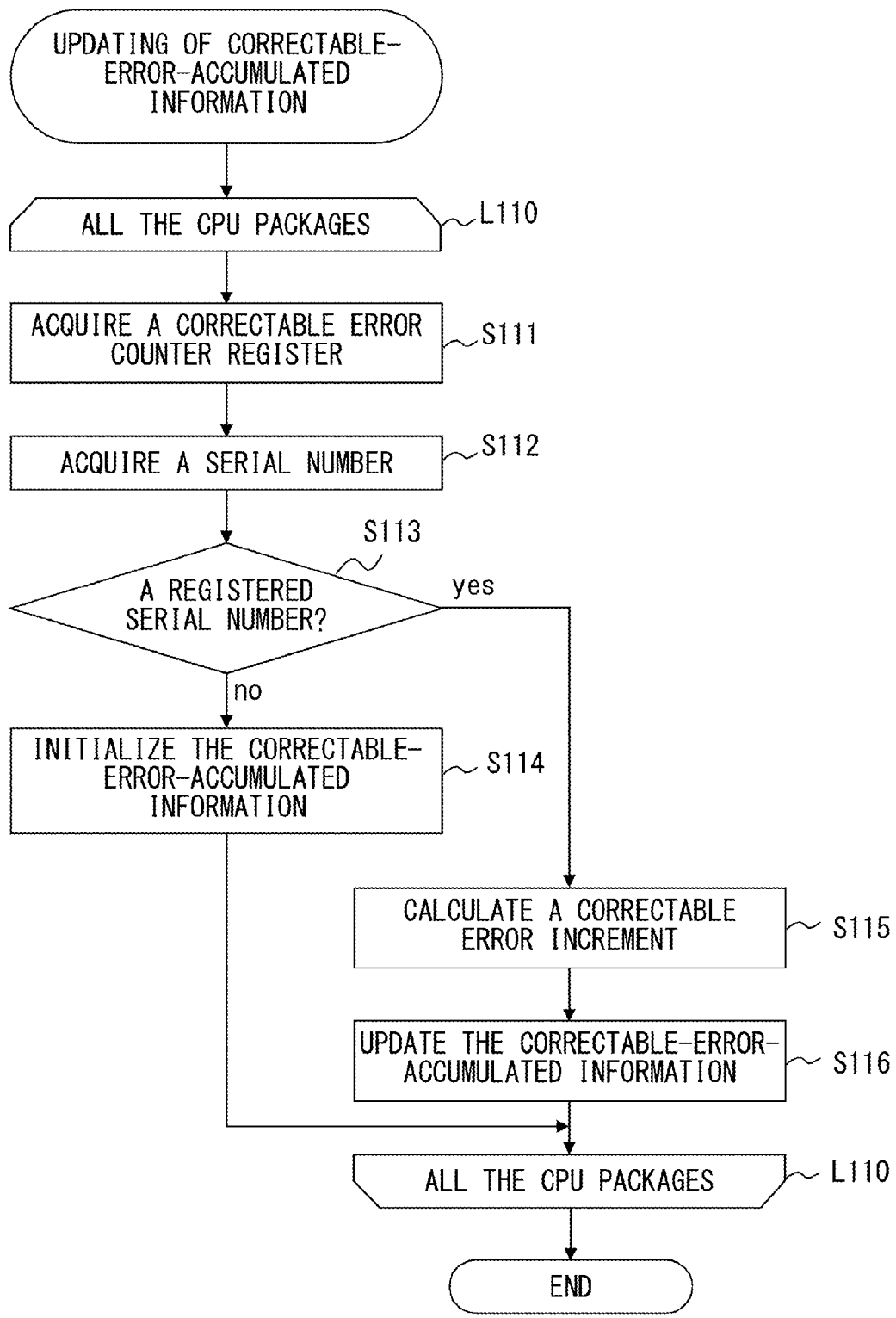
FIG. 24 is a flowchart of updating process of correctable-error-accumulated information.
Figure 25:
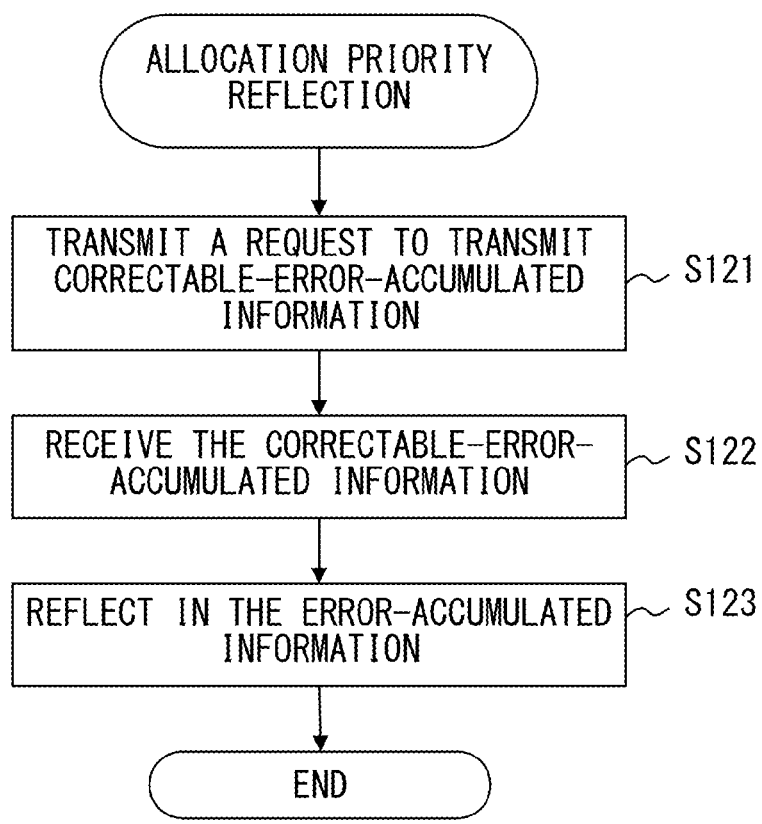
FIG. 25 is a flowchart of allocation priority reflection process.

Referring hereinafter to FIGS. 23 to 25, operations of the above-mentioned management controller 800 and the VMM 220 will each be described in detail.

FIG. 23 is a flowchart of overall processing that is performed by the management controller. First, operation of the management controller 800 will be described in detail referring to FIGS. 23 and 24.

The processes performed by the management controller 800 for cooperating with the VMM 220 are picked up, and the overall processing in the flowchart of FIG. 23 represents a flow of the picked up processes. For the management controller 800, first, the overall processing will be described in detail referring to FIG. 23. The overall processing is started when a certain time period elapses since it was performed last time, or when a request is received from the VMM 220 (in particular, from any of the CPU packages 211).

The management controller 800 operates by the CPU 811 retrieving firmware stored in the flash memory 813 in the memory 812 and executing the firmware. Thus, the CPU 811 is assumed as an element that performs the processing.

First, the CPU 811 determines whether a certain time period ("WAIT TIME" in FIG. 23) has elapsed since the overall processing was last performed (S101). When a certain time period has not elapsed since the overall processing was last performed, it is determined to be no in S101 and the process moves on to S103. When a certain time period has elapsed since the overall processing was last performed, it is determined to be yes in S101 and the process moves on to S102.

In S102, the CPU 811 acquires a value of the correctable error counter register 217 from each of the CPU packages 211, and performs updating process of correctable-error-accumulated information to update the correctable-error-accumulated information 821. After that, the CPU 811 determines whether a request to transmit the correctable-error-accumulated information 821 has been received from the VMM 220 (S103). When any of the CPU packages 211 has transmitted the transmission request, it is determined to be yes in S103 and the process moves on to S104. When none of the CPU packages 211 has transmitted the transmission request, it is determined to be no in S103, and the overall processing ends here.

In S104, the CPU 811 transmits the correctable-error-accumulated information 821 to the CPU package 211 that has made the request. After the correctable-error-accumulated information 821 is transmitted, the overall processing ends.

FIG. 24 is a flowchart of updating process of correctable-error-accumulated information that is performed in S102 mentioned above. Next, the updating process of correctable-error-accumulated information will be described in detail referring to FIG. 24.

In the updating process of correctable-error-accumulated information, a processing loop L110 is formed that acquires a value of the correctable error counter register 217 for each of the CPU packages 211 and updates the corresponding error-accumulated-value information in the correctable-error-accumulated information 821. The updating process of correctable-error-accumulated information ends with the end of the processing loop L110.

In the processing loop L110, first, the CPU 811 selects one of the recognized CPU packages 211 and acquires a value of the correctable error counter register 217 from the selected CPU package 211 (S111). Then, the CPU 811 acquires a serial number from the selected CPU package 211 (S112). After that, the CPU 811 determines whether the acquired serial number has been registered in the correctable-error-accumulated information 821 (S113). When the acquired serial number has been stored in the correctable-error-accumulated information 821, it is determined to be yes in S113 and the process moves on to S115. When the acquired serial number has not been stored in the correctable-error-accumulated information 821, in other words, when a CPU package 211 that had not existed has been newly identified, it is determined to be no in S113 and the process moves on to S114.

In S114, the CPU 811 initializes the correctable-error-accumulated information 821. The initialization of the correctable-error-accumulated information 821 indicates, for example, clearing all error-accumulated-value information. The acquired serial number is newly registered in the correctable-error-accumulated information 821. After such processing performed in S114, the series of processing in the processing loop L110 ends.

On the other hand, in S115, the CPU 811 calculates an increment of a value of the correctable error counter register 217, that is, the number of correctable errors that occurred during a certain time period, by subtracting a previously acquired value of the correctable error counter register 217 from the value of it acquired this time. After that, the process moves on to S116.

In S116, the CPU 811 updates the correctable-error-accumulated information 821 by use of the calculated increment. The updating is performed by rewriting the corresponding error-accumulated-value information in the correctable-error-accumulated information 821 into a value obtained by adding the increment to the previous value. The series of processing in the processing loop L110 ends with the updating of the correctable-error-accumulated information 821.

The processing loop L110 whose series of processing has ended ends when there is not any other target CPU package 211 to be targeted. In this case, from among the serial numbers stored in the correctable-error-accumulated information 821, a serial number that has not been acquired is deleted. The reason is that it is more likely that a CPU package 211 whose serial number has not been acquired has been removed from the information processing device 200 or that a failure has occurred in such a CPU package 211. Accordingly, the updating process of correctable-error-accumulated information ends after performing such an operation on the correctable-error-accumulated information 821. On the other hand, when there is any other CPU package 211 to be targeted left, the process returns to S111 mentioned above. Accordingly, the processing loop L110 continues to be performed.

In the second embodiment, as described above, a portion of the overall processing in the flowchart of FIG. 12 is different from that in the first embodiment. In the second embodiment, allocation priority reflection process is performed in S10 after S7.

The allocation priority reflection process is processing to acquire the correctable-error-accumulated information 821 from the management controller 800 and to update the allocation priority information 226 created in S7 by use of the acquired correctable-error-accumulated information 821. The CPU-error-accumulated-information acquiring unit 222d is realized by a CPU core 215 performing the allocation priority reflection process. Next, the allocation priority reflection process will be described in detail with reference to the flowchart in FIG. 25.

First, a CPU core 215 transmits a request to transmit correctable-error-accumulated information 821 to the management controller 800 (S121). Next, the CPU core 215 waits until the correctable-error-accumulated information 821 is received, and acquires the received correctable-error-accumulated information 821 (S122).

The CPU 811 that has acquired the correctable-error-accumulated information 821 extracts all the error-accumulated-value information from the acquired correctable-error-accumulated information 821, and overwrites the created allocation priority information 226 with the extracted respective pieces of error-accumulated-value information (S123). Accordingly, the allocation priority reflection process ends after the reflection of the correctable-error-accumulated information 821 in the allocation priority information 226.

In the second embodiment, the CPU core switching process in S8 is performed after the above-mentioned allocation priority reflection process is performed in S10.

In the first embodiment, the CPU core switching process in the flowchart of FIG. 17 is performed. In the second embodiment, from among the CPU packages 211 that are given the same priority, a CPU core 215 in a CPU package whose accumulated value represented by error-accumulated-value information is smaller is preferentially allocated to a virtual machine 231. Accordingly, in the second embodiment, for the CPU cores 215 in the CPU packages 211 for which the priority targeted in the processing loop L50 has been set, a CPU core 215 in a CPU package 211 whose accumulated value is smaller is targeted earlier in the processing loop L55. The difference from the first embodiment is the order of selecting a CPU core 215 in a CPU package 211 to be targeted in the processing loop L55.

In both the first and second embodiments, a priority relationship between virtual machine groups 230 is not considered, but the priority relationship may be considered. Consideration of the priority relationship between virtual machine groups 230 allows longer operation of a more important virtual machine group 230. Further, cancellation of allocation of a CPU core 215 to a virtual machine 231 that belongs to a virtual machine group 230 that is less important or is not allowed to continue to operate can be selected, so a virtual machine group 230 that has to continue to operate can operate more stably. Preferably, one virtual machine 231 that does not belong to a virtual machine group 230 is considered one virtual machine group 230.

A system according the embodiments described above permits further prevention of a decrease in operation performance due to a failure even if the failure occurs in a CPU package (an arithmetic processing unit).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing device comprising:
a processor;
a storage which has stored therein setting information that specifies, for each virtual machine to be created, a number of arithmetic processing unit cores that have to be allocated to a virtual machine, and group information that represents a plurality of virtual machines operating in cooperation as a group, from among the virtual machines represented by the setting information; and
a virtual machine monitor which, when a first virtual machine to which the arithmetic processing unit cores are to be allocated has been created, from among the virtual machines represented by the setting information, refers to the setting information and the group information so as to allocate as many arithmetic processing unit cores as the setting information specifies to the first virtual machine, according to a rule that takes account of a decrease in operation performance of all the operable virtual machines that are associated with a failure occurring in any of the arithmetic processing units provided with the arithmetic processing unit cores, wherein
the virtual machine monitor assigns a priority to each of the number of arithmetic processing unit cores according to an allocation-priority determination policy that assigns a first priority to an arithmetic processing unit whose arithmetic processing unit cores have not been allocated any virtual machine, a second priority to an arithmetic processing unit whose arithmetic processing unit core has been allocated a virtual machine that belongs to a same group as the first virtual machine, and a third priority to an arithmetic processing unit whose arithmetic processing unit core has been allocated a virtual machine that does not belong to the same group as the first virtual machine, and
the virtual machine monitor allocates, according to the rule and the allocation-priority determination policy, arithmetic processing units including the arithmetic processing unit cores to be allocated to the first virtual machine, in an order of priority of the first priority, the second priority, and the third priority, wherein the second priority is lower than the first priority and the third priority is lower than the second priority.

2. The information processing device according to claim 1, wherein
when a virtual machine represented by the setting information is created, the virtual machine monitor allocates, according to the rule, the arithmetic processing unit cores provided in the arithmetic processing units to different virtual machines, and
when the arithmetic processing unit cores provided in the arithmetic processing units are not allowed to be allocated to different virtual machines, the virtual machine monitor allocates one or more arithmetic processing unit cores provided in the same arithmetic processing unit to two or more virtual machines that belong to the same group.

3. The information processing device according to claim 1, wherein the virtual machine monitor
detects a failure sign that has appeared in the arithmetic processing unit including the arithmetic processing unit core to which the virtual machine has been allocated, and
when detecting a failure sign that has appeared in any of the arithmetic processing units, determines, as the first virtual machine, a virtual machine that has been allocated an arithmetic processing unit core in the arithmetic processing unit in which the failure sign has been detected, so as to allocate a new arithmetic processing unit core to the first virtual machine.

4. The information processing device according to claim 1, wherein the virtual machine monitor
acquires state information that represents a state in each arithmetic processing unit, and
further refers to the state information so as to allocate the arithmetic processing unit cores to the first virtual machine, according to the rule.

5. The information processing device according to claim 1, wherein the state information represents a frequency of an error occurrence in each of the arithmetic processing units.

6. A resource allocation method executable by an information processing device that includes a plurality of arithmetic processing units provided with a plurality of arithmetic processing unit cores and that creates a plurality of virtual machines represented by setting information, the resource allocation method comprising:
when a first virtual machine to which the arithmetic processing unit cores are to be allocated has been created, from among the virtual machines represented by the setting information stored by a storage which has stored therein setting information that specifies, for each virtual machine to be created, a number of arithmetic processing unit cores to be allocated to a virtual machine, and group information that represents a plurality of virtual machines operating in cooperation as a group, from among the virtual machines represented by the setting information, referring to, by a virtual machine monitor, the setting information and the group information so as to allocate as many arithmetic processing unit cores as the setting information specifies to the first virtual machine, according to a rule that takes account of a decrease in operation performance of all the operable virtual machines that is are associated with a failure occurring in any of the arithmetic processing units provided with the arithmetic processing unit cores, wherein, the referring to includes assigning, by the virtual machine monitor, a priority to each of the number of arithmetic processing unit cores according to an allocation-priority determination policy that assigns a first priority to an arithmetic processing unit whose arithmetic processing unit cores have not been allocated any virtual machine, a second priority to an arithmetic processing unit whose arithmetic processing unit core has been allocated a virtual machine that belongs to a same group as the first virtual machine, and a third priority to an arithmetic processing unit whose arithmetic processing unit core has been allocated a virtual machine that does not belong to the same group as the first virtual machine, and allocating, by the virtual machine monitor, according to the rule and the allocation-priority determination policy, arithmetic processing units including the arithmetic processing unit cores to be allocated to the first virtual machine, in an order of priority of the first priority, the second priority, and the third priority, wherein the second priority is lower than the first priority and the third priority is lower than the second priority.

7. A non-transitory computer-readable recording medium having stored therein a program for causing an information processing device that includes a plurality of arithmetic processing units provided with a plurality of arithmetic processing unit cores and that creates a plurality of virtual machines represented by setting information to execute a process comprising:

when a first virtual machine to which the arithmetic processing unit cores are to be allocated has been created from among the virtual machines represented by the setting information stored by a storage which has stored therein setting information that specifies, for each virtual machine to be created, a number of arithmetic processing unit cores to be allocated to a virtual machine, and group information that represents a plurality of virtual machines operating in cooperation as a group, from among the virtual machines represented by the setting information, referring to the setting information and the group information so as to allocate as many arithmetic processing unit cores as the setting information specifies to the first virtual machine, according to a rule that takes account of a decrease in operation performance of all the operable virtual machines that is associated with a failure occurring in any of the arithmetic processing units provided with the arithmetic processing unit cores, wherein the referring includes assigning, by a virtual machine monitor, a priority to each of the number of arithmetic processing unit cores according to an allocation-priority determination policy that assigns a first priority to an arithmetic processing unit whose arithmetic processing unit cores have not been allocated any virtual machine, a second priority to an arithmetic processing unit whose arithmetic processing unit core has been allocated a virtual machine that belongs to a same group as the first virtual machine, and a third priority to an arithmetic processing unit whose arithmetic processing unit core has been allocated a virtual machine that does not belong to the same group as the first virtual machine, and allocating, by the virtual machine monitor, according to the rule and the allocation-priority determination policy, arithmetic processing units including the arithmetic processing unit cores to be allocated to the first virtual machine, in an order of priority of the first priority, the second priority, and the third priority, wherein the second priority is lower than the first priority and the third priority is lower than the second priority.

* * * * *